US008383703B2

(12) United States Patent
Tennison et al.

(10) Patent No.: US 8,383,703 B2
(45) Date of Patent: Feb. 26, 2013

(54) MAKING DISCRETE SOLID PARTICLES OF POLYMERIC MATERIAL

(75) Inventors: Stephen Robert Tennison, Surrey (GB); Jonathan Robert Tunbridge, Hampshire (GB); Roger Nicholas Place, Camberley (GB); Oleksandr Kozynchenko, Basingstoke (GB)

(73) Assignee: British American Tobacco (Investments) Limited, London (GB)

( * ) Notice: Subject to any disclaimer, the term of this patent is extended or adjusted under 35 U.S.C. 154(b) by 635 days.

(21) Appl. No.: 12/444,839

(22) PCT Filed: Oct. 4, 2007

(86) PCT No.: PCT/GB2007/003759
§ 371 (c)(1),
(2), (4) Date: Dec. 7, 2009

(87) PCT Pub. No.: WO2008/043983
PCT Pub. Date: Apr. 17, 2008

(65) Prior Publication Data
US 2010/0086469 A1   Apr. 8, 2010

(30) Foreign Application Priority Data

Oct. 9, 2006 (GB) .................................. 0619974.9
May 24, 2007 (GB) .................................. 0710007.6

(51) Int. Cl.
*B01F 3/00* (2006.01)
(52) U.S. Cl. ........ 523/313; 523/223; 523/312; 523/340; 523/344; 523/348; 526/88; 528/481; 528/499; 528/501; 366/DIG. 1
(58) Field of Classification Search .................. None
See application file for complete search history.

(56) References Cited

U.S. PATENT DOCUMENTS

| | | | | |
|---|---|---|---|---|
| 3,620,988 A * | 11/1971 | Cohen | ............................ | 524/723 |
| 4,424,318 A * | 1/1984 | Vairetti et al. | ................... | 526/88 |
| 4,487,898 A * | 12/1984 | Kato et al. | ....................... | 526/65 |
| 4,666,673 A * | 5/1987 | Timm | ........................... | 422/135 |
| 5,777,049 A * | 7/1998 | Geddes et al. | ................... | 526/64 |
| 6,610,798 B1 * | 8/2003 | Bleijenberg et al. | ............ | 526/88 |
| 6,943,223 B1 * | 9/2005 | Bleijenberg et al. | ............ | 526/88 |
| 2009/0273105 A1 * | 11/2009 | McQuade et al. | ................. | 264/4 |

FOREIGN PATENT DOCUMENTS

| | | |
|---|---|---|
| EP | 042192 A | 12/1981 |
| EP | 051210 A | 5/1982 |
| GB | 2280898 A | 2/1995 |
| WO | WO96/21616 A1 | 7/1996 |
| WO | WO01/83368 A1 | 11/2001 |
| WO | WO01/89993 A1 | 11/2001 |
| WO | WO0212380 A | 2/2002 |
| WO | WO2006103404 A | 10/2006 |

OTHER PUBLICATIONS

International Preliminary Report on Patentability corresponding to PCT/GB2007/003759 mailed Feb. 9, 2010.
PCT International Search Report and Written Opinion mailed Jan. 28, 2010.
Zalc, J. M. et al., "Mixing Dynamics in the SMX Static Mixer As A Function of Injection Location and Flow Ratio", Polymer Engineering & Science, vol. 43, p. 875-890, Apr. 2003.
PCT Partial Search Report dated Feb. 11, 2008.

\* cited by examiner

*Primary Examiner* — Marc Zimmer
(74) *Attorney, Agent, or Firm* — Cooley LLP

(57) ABSTRACT

A process is provided for producing discrete solid beads of polymeric material e.g. phenolic resin having a mesoporous structure, which process may produce resin beads on an industrial scale without aggregates of resin building up speedily and interrupting production. The process comprises the steps of: (a) combining a stream of a polymerizable liquid precursor e.g. a novolac and hexamine as cross-linking agent dissolved in a first polar organic liquid e.g. ethylene glycol with a stream of a liquid suspension medium which is a second non-polar organic liquid with which the liquid precursor is substantially or completely immiscible e.g. transformer oil containing a drying oil; (b) mixing the combined stream to disperse the polymerizable liquid precursor as droplets in the suspension medium e.g. using an in-line static mixer; (c) allowing the droplets to polymerise in a laminar flow of the suspension medium so as to form discrete solid beads that cannot agglomerate; and (d) recovering the beads from the suspension medium. Also provided is an apparatus for forming discrete solid beads of polymeric material. In other embodiments, a method is provided for carbonizing and activating carbonaceous material, and an externally fired rotary kiln for carbonizing and activating carbonaceous material.

21 Claims, 7 Drawing Sheets

MAKING DISCRETE SOLID PARTICLES OF POLYMERIC MATERIAL

CLAIM FOR PRIORITY

This application is a National Stage Entry entitled to and hereby claims priority under 35 U.S.C. §§365 and 371 corresponding to PCT Application No. PCT/GB2007/003759, titled, "MAKING DISCRETE SOLID PARTICLES OF POLYMERIC MATERIAL," filed Oct. 4, 2007, which in turn claims priority to British Application Serial No. GB 0710007.6, filed May 24, 2007, and British Application Serial No. GB 0619974.9, filed Oct. 9, 2006, all of which are hereby incorporated by reference.

FIELD OF THE INVENTION

This invention relates to a process which can be operated on an industrial scale for the manufacture of organic resins in bead form from liquid precursors that undergo rapid polymerization under intended conditions. It is particularly, but not exclusively concerned with the production of beads of resin that may be carbonized to form beads of carbon, although the resin beads formed may have other utilities e.g. as ion exchange resins. The invention also provides apparatus for forming discrete solid beads of polymeric material in which in some embodiments the above mentioned process can be implemented. The invention provides a method and apparatus for carbonizing and activating carbonaceous material which is particularly, but not exclusively suitable for carbonization and activation of the above mentioned resin beads. The invention also provides a method and apparatus for making activated carbon.

BACKGROUND TO THE INVENTION

Production of Polymer Beads

The production of polymer beads by controlled droplet coalescence in a laminar liquid stream followed by dispersion polymerization in a descending column of liquid to produce hardened beads which are subsequently further heated for 6-8 hours to complete polymerization is disclosed in U.S. Pat. No. 4,424,318 (Vairetti et al.). The beads are a copolymer of styrene and divinylbenzene, and the dispersion medium is aqueous calcium chloride containing bentonite and sodium lignosulphonate. The process is inapplicable to rapidly polymerizing mixtures owing to the prolonged coalescence stage, there is no disclosure or suggestion that polymerization can be completed in a laminar flow column, nor is there any suggestion that the dispersion medium can be other than aqueous. The knowledge and belief of the inventors is that the Vairetti process has not been commercialized and that production of styrene/divinylbenzene beads remains a stirred batch process.

Preparation of Beads of Inter Alia Styrene/Divinylbenzene Copolymer is Also disclosed in U.S. Pat. No. 6,492,471 (Eisenbeiss et al. Merck) where it is explained that the problem of producing bead polymers on a large industrial scale remains unsolved. The reasons include mixing problems, problems in obtaining a desired bead size distribution and the formulation of caked aggregates in dead spaces. The disclosed solution is to use high performance micromixers. The continuous phase is water, water/alcohol or water/organic solvent and the dispersed phase is a hydrocarbon or sparingly water-miscible hydrocarbon which contains the monomer or monomers to be polymerized. Particular preference is given to the so-called LIGA micromixing system (micromixer) from IMM (Institut fur Mikrotechnik Mainz GmbH) in which two liquid streams are transported in opposite directions to one another in specially shaped microchannels in a mixing unit and subsequently discharged through a slot perpendicular to the flow direction. Production of particles of size 0.1-300 µm is envisaged, more typically 1-20 µm or 10-50 µm, and the formation of larger droplets is not disclosed. The use of micromixers is inappropriate for polymerizable liquid precursors whose rate of polymerization is relatively rapid at the intended mixing temperature because in such mixers the size of the channels is the same as that of the beads produced and there is a high probability of the mixer being blocked by accumulating deposits of polymer. Furthermore, the use of laminar flow conditions for polymerization of the dispersed droplets is neither disclosed nor suggested.

A problem with which this invention is concerned is to provide a process which can produce resin beads on an industrial scale without aggregates of resin building up speedily and interrupting production.

Production of Mesoporous Beads

That problem has become relevant to the present applicants who are seeking to produce on an industrial scale mesoporous beads of phenolic resin as intermediates in the production of beads of carbon having a mesoporous/microporous pore structure.

WO 02/12380 (Tennison et al., the disclosure of which is incorporated herein by reference) discloses making a mesoporous resin by condensing a nucleophilic component which comprises a phenolic compound or a phenol condensation prepolymer with at least one electrophilic cross-linking agent selected from formaldehyde, paraformaldehyde, furfural and hexamethylene tetramine in the presence of a pore-former selected from the group consisting of a diol (e.g. ethylene glycol), a diol ether, a cyclic ester, a substituted cyclic ester, a substituted linear amide, a substituted cyclic amide, an amino alcohol and a mixture of any of the above with water to form a resin. The pore-former is present in an amount effective to impart mesoporosity to the resin (e.g. at least 120 parts by weight of the pore former being used to dissolve 100 parts by weight of the nucleophilic component, which corresponds to 100 parts by weight of the total resin forming components, i.e. nucleophilci component plus electrophilic component), and it is removed from the porous resin after condensation by washing or by vacuum drying. The resulting resin may be carbonised by heating in an inert atmosphere to a temperature of at least 600° C. to give a material having a bimodal distribution of pores, the pore structure as estimated by nitrogen adsorption porosimetry comprising micropores of diameter up to 20 Å and mesopores of diameter 20-500 Å, and the material also containing macropores. The value for the differential of pore volume with respect to the logarithm of pore radius (dV/d log R) for the mesopores is greater than 0.2 for at least some values of pore size in the range 20-500 Å The mesoporous carbon may have a BET surface area of 250-800 m$^2$/g without activation. It may be activated by heating it at high temperature in the presence of carbon dioxide, steam or a mixture thereof, e.g. by heating it in carbon dioxide at above 800° C., or it may be activated by heating it in air at above 400° C. It may then have surface areas of up to 2000 m$^2$/g. As used herein the term "BET surface area" is determined by the Brunauer, Emmett, and Teller (BET) method according to ASTM D1993-91, see also ASTM D6556-04.

In WO 02/12380, production of the resin in both powder and bead form is disclosed. Production of the bead form may be by pouring partially cross-linked pre-polymer into a hot liquid such as mineral oil containing a dispersing agent and stirring the mixture. The pre-polymer solution forms into beads which are initially liquid and then, as curing proceeds, become solid. The average bead particle size is controlled by several process parameters including the stirrer type and speed, the oil temperature and viscosity, the pre-polymer solution viscosity and volume ratio of the solution to the oil and the mean size can be adjusted between 5 and 2000 µm, although in practice the larger bead sizes are difficult to achieve owing to problems with the beads in the stirred dispersion vessel. The beads can then be filtered off from the oil. In a preparative example, industrial novolac resin is mixed with ethylene glycol at an elevated temperature, mixed with hexamine and heated to give a viscous solution which is poured into mineral oil containing a drying oil, after which the mixture is further heated to effect curing. On completion of curing, the reaction mixture is cooled, after which the resulting mesoporous resin is filtered off, and washed with water to remove pore former and a small amount of low molecular weight polymer. The cured beads are carbonized to mesoporous carbon beads which have a pore structure as indicated above, and may be activated as indicated above. It is stated that the beads can be produced with a narrow particle size distribution e.g. with a D90.D10 of better than 10 and preferably better than 5. However, the bead size distribution that can be achieved in practice in stirred tank reactors is relatively poor, and the more the process is scaled up the worse the homogeneity of the mixing regime and hence the particle size distribution becomes.

Patent Application WO 2006/103404 (Cashmore et al., British American Tobacco Co, the disclosure of which is incorporated herein by reference) discloses that the above mesoporous carbon beads are suitable for incorporation into smoke filters of cigarettes, and that carbonized resins obtained from phenoloc resins cross-linked by nitrogen-containing cross-linking agents e.g. hexamethylenetetramine or melamine or produced from nucleophilic precursors such as amino phenols are particularly effective for removing hydrogen cyanide from the vapour phase of tobacco smoke, and also perform well in the removal of formaldehyde, acetaldehyde and 1,3-butadiene. Porous carbon in the form of microbeads e.g. of size 50-1000 µm is said to be particularly suitable for handling in the manufacture of smoking articles because the microbeads have a reduced risk of sticking together and giving rise to uneven loading of absorbent material tow for forming into cigarette filters, and because they have a low attrition rate and therefore generate less dust as compared to known forms of carbon e.g. coconut charcoal.

A more specific problem with which the invention is concerned is therefore the production of mesoporous beads of phenolic resin on an industrial scale without rapid formation of aggregates of polymerized material that would interfere with production.

Bead Carbonization and Activation

Both carbonization and activation of carbonaceous materials in rotary kilns is known, but the processes involved in practical production are slow and the materials produced vary in their properties.

U.S. Pat. No. 1,505,517 (Woodruff et al.) discloses the activation of carbon in a rotary kiln rotating at about 1 revolution every 2 minutes, inclined at a small angle to the horizontal and provided with flights which serve both to agitate the material within the kiln and to elevate that material and drop it through the kiln atmosphere, the preferred activating material being steam, although the use of carbon dioxide is also mentioned. Treatment of highly flowable materials in bead form is not disclosed and no means is provided for retarding the flow of material through the furnace and hence of controlling residence time.

U.S. Pat. No. 4,344,821 (Angelo) discloses a process for simultaneous drying, carbonization and activation of carbonaceous material of animal or vegetable origin in a rotary kiln. It is explained that once the carbonization reaction is initiated, it is self-sustaining, but that that the heat generated is insufficient to dry the incoming material. Air is introduced into the kiln to partially combust the gases given off during carbonization and hence provide the heat needed for the drying stage. The present inventors are of the view that any introduction of air into the kiln is to be avoided, especially in the case of mesoporous materials. For activation, superheated steam is injected at the lower end region of the kiln directly into the bed of char for the purpose of activating the char without steam circulating into the region above the bed. Again, treatment of highly flowable materials in bead form is not disclosed and no means is provided for retarding the flow of material through the furnace and hence of controlling residence time.

U.S. Pat. No. 6,316,378 (Gibelhausen et al., CarboTex GmbH) is concerned with the production of carbon beads from resinous raw materials e.g. ion exchange beads using a rotary tunnel dryer. In an example, resin was supplied to a rotary drying kiln having a length to diameter ratio of 5.5 to achieve a filling level of 20%, the kiln having lift scoops for turning over the product and the product having a transport speed of 11.1 cm/minute, drying being in a countercurrent of hot gas. Carbonization and activation were then carried out in a rotary tunnel kiln filled to a filling ratio of 11%, having a co-current flow of steam and employing temperatures of 850-900° C. The kiln had a length to diameter ratio of 12, the transport speed of the product was 28 cm/minute, the residence time was 514 minutes, and the steam was introduced about 20% of the distance along the kiln. The disclosed drying conditions would destroy mesoporosity in the resin beads. According to the calculations of the present inventors, the dryer length was 5 meters, the pyrolysis region was 36 meters long and the activation region was about 144 meters long. Although the kiln sloped downwardly, it must have been at a very shallow angle owing to its length, and there is no disclosure or suggestion of annular weirs to control the flow of beads along the furnace and hence the residence time.

SUMMARY OF THE INVENTION

That problem may be solved, according to the invention, by a process for producing discrete solid beads of polymeric material, said process comprising the steps of: (a) forming a combined stream from a stream of a polymerizable liquid precursor and a stream of a liquid dispersion medium with which the liquid precursor is substantially or completely immiscible; (b) treating the combined stream so as to disperse the polymerizable liquid precursor as droplets in the dispersion medium; (c) allowing the droplets to polymerise in a laminar flow of the dispersion medium so as to form discrete solid beads that cannot agglomerate; and (d) recovering the beads from the dispersion medium, the dispersive treatment time being short compared to the laminar flow polymerization time so that agglomeration of the liquid precursor during dispersive treatment is substantially avoided.

There is no simple numerical definition of the relationship between dispersive treatment time and laminar flow polymerization time, because this will vary between one reactive component system and another and will depend on the nature and amount of solvent in the polymerizable liquid precursor and on the temperatures used. However, in some embodiments the dispersive treatment time is <5% of the laminar flow polymerization time, more preferably in some embodiments <2% and still more preferably in some embodiments <1%. In a laminar descending flow polymerization column which is employed in embodiments of the invention, the laminar flow polymerization time can be considered to be the average time for dispersed droplets to pass down the column.

There is also provided apparatus for forming discrete solid beads of polymeric material, said apparatus comprising: a first line for conveying a stream of a polymerizable liquid precursor; a second line for conveying a stream of a dispersion medium with which the polymerizable liquid precursor is substantially or completely immiscible; an in-line mixer configured to receive a combined flow from the first and second lines and to disperse the polymerizable liquid precursor as droplets in the dispersion medium; a vertical polymerization column configured to receive the dispersion medium with the droplets dispersed therein and to permit the polymerizable liquid precursor polymerize while descending the column in a descending flow of polymerization medium; and a vessel at the base of the column for receiving the descending flow of dispersion medium and collecting polymerized solid beads.

Embodiments of the apparatus further comprise: first and second vessels for storage of first and second liquid components of the polymerizable liquid precursor; first and second component lines for conveying the liquid components; first and second non-pulsating pumps in said lines for conveying component streams through the lines; and a second in-line mixer configured to receive and mix the streams of the first and second components and to form a polymerizable liquid precursor stream.

A heater may be provided in one or both of the first and second component lines for heating one or both of the streams flowing to the second in-line mixer. The apparatus may further comprise a storage vessel for dispersion medium, a line leading from the storage vessel to the in-line mixer, and a third non-pulsating pump in said line for conveying a stream of dispersion medium. The dispersion medium line may comprise a heat exchanger for heating the stream of dispersion medium from the storage vessel, the apparatus may further comprise a third in-line mixer configured to receive heated dispersion medium from the heat exchanger and to supply dispersion medium that has passed through it to the first in-line mixer, and the vessel at the base of the column may be a stirred tank or it may be a settling tank having an outlet for beads forming a sediment in said tank.

The invention further provides a method for carbonizing and activating carbonaceous material, which comprises supplying the material to an externally fired rotary kiln maintained at carbonizing and activating temperatures, the kiln having a downward slope to progress the material as it rotates, the kiln having an atmosphere substantially free of oxygen provided by a counter-current of steam or carbon dioxide, and annular weirs being provided at intervals along the kiln to control progress of the material.

In a further aspect the invention provides an externally fired rotary kiln for carbonizing and activating carbonaceous material having a hollow rotary body that has a downward slope towards a discharge end thereof, and which is provided at intervals along its length with annular weirs for controlling progress of the carbonaceous material.

In another aspect, the invention provides a method of preparing activated carbon by subjecting char in a rotary furnace at an elevated temperature to an atmosphere of activating gas, wherein annular baffles within the furnace define treatment zones in sequence along the furnace, and wherein fresh char entering the furnace causes material being activated to overflow the baffles from one treatment zone to the next.

In yet another aspect, the invention provides a method of preparing activated carbon by subjecting char in a rotary furnace at an elevated temperature to an atmosphere of activating gas, wherein annular baffles within the furnace define treatment zones in sequence along the furnace, and wherein fresh char entering the furnace causes material being activated to overflow the baffles from one treatment zone to the next, and wherein lift bars located in the treatment zones lift portions of beds of the char as the furnace rotates and then permit char to cascade through the activating gas atmosphere and to return to the bed.

BRIEF DESCRIPTION OF THE DRAWINGS

How the invention may be put into effect will now be described, by way of example only, with reference to the accompanying drawings, in which:

FIG. 5 is a simplified flow sheet for a second embodiment of apparatus suitable for production of polymer beads and FIG. 5a is a detail of an overflow tank forming part of the apparatus of FIG. 5. (Parts in FIG. 5 and having the same function as those in FIG. 1 are labelled so far as possible with reference numerals which are the same as in FIG. 1 but incremented by 100, so that the tank 10 in FIG. 1 is labelled as tank 110 in FIG. 5);

DETAILED DESCRIPTION OF PREFERRED EMBODIMENTS

Figure 1:
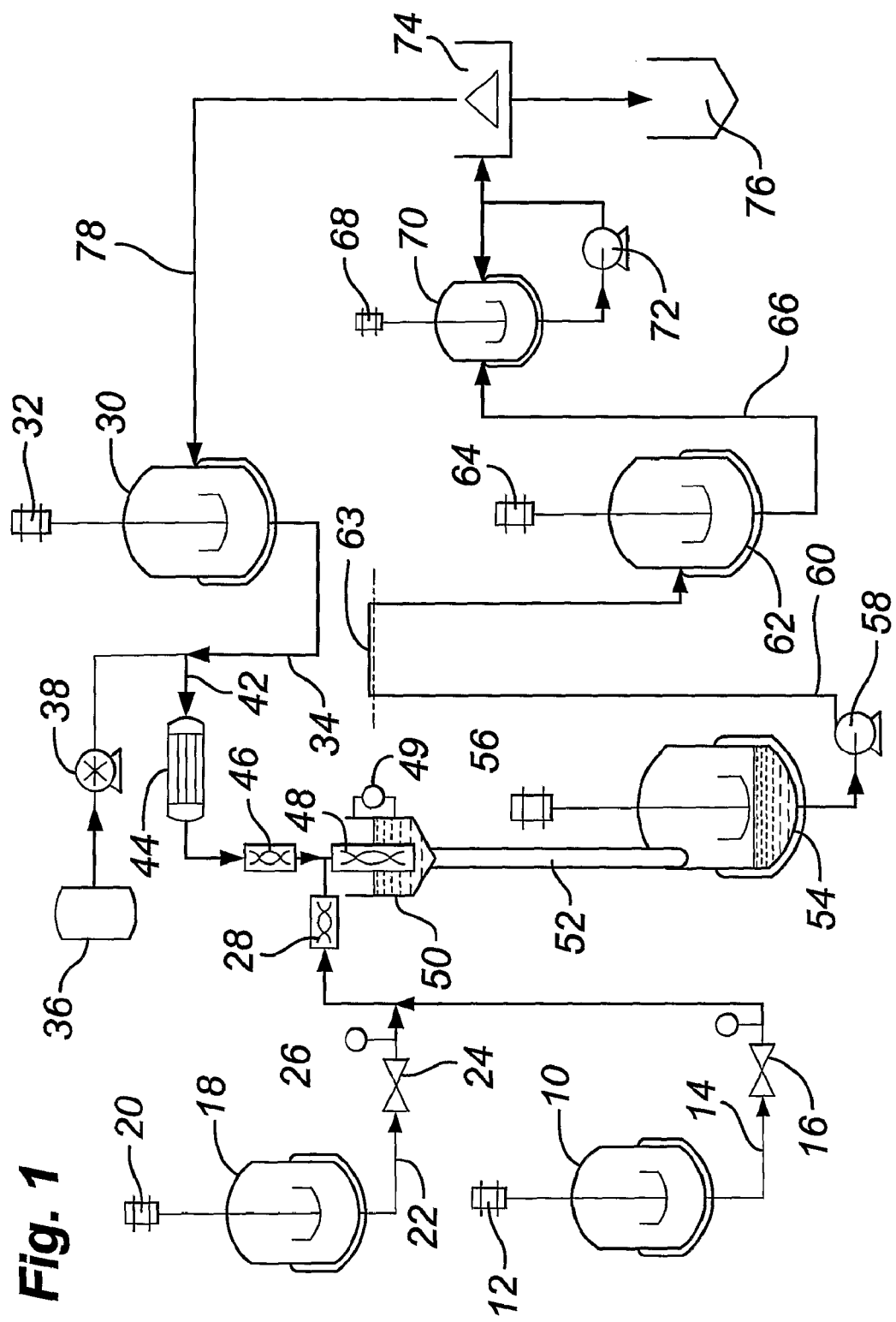
FIG. 1 is a simplified flow sheet for a first embodiment of apparatus suitable for production of polymer beads.

As used herein, the term "microporous" refers to a carbon or other material possessing pores with diameter <2 nm, as measured by nitrogen adsorption and mercury porosimetry methods and as defined by IUPAC.

As used herein, the term "mesoporous" refers to a carbon or other material possessing alongside micropores, pores with diameter from ca. 2 nm to ca. 50 nm, as measured by nitrogen adsorption and mercury porosimetry methods and as defined by IUPAC.

As used herein, the term "macroporous" refers to a carbon or other material possessing alongside micropores pores with diameters larger than 50 nm, as measured by nitrogen adsorption and mercury porosimetry methods and as defined by IUPAC.

Embodiments of the invention relate to the formation of cured resin beads from liquid precursors that become polymerizable by combination and mixing of first and second component streams to give a combined stream that after dispersion in liquid suspension medium at or close to the intended polymerization temperature undergoes substantially complete polymerization within a short time period e.g. 0.2-5 minutes e.g. 0.5-4 minutes. Problems in the handling of such reaction systems include:

effective mixing of the first and second component streams;

effective dispersion of the liquid precursor in the dispersion medium to give droplets of desired size with a desired range of droplet sizes and to complete the dispersion step within a time that is short compared to the polymerization time so that unintended increases in viscosity and/or deposition of agglomerated materials are substantially avoided; and conducting polymerization under conditions such that the beads formed neither break up nor aggregate during polymerization and when collected have hardened sufficiently that they will not aggregate even when in mutual contact.

The present process, when used to make mesoporous activated carbon, may comprise the following successive steps:
1. Combine and mix components to form polymerizable liquid precursor.
2. Disperse polymerizable liquid precursor as droplets in a dispersion medium.
3. Polymerize liquid precursor droplets in laminar flow of dispersion medium.
4. Recover resulting beads from dispersion medium
5. Wash beads
6. Vacuum dry beads
7. Heat treat beads to remove residual solvent
8. Carbonise beads
9. Activate carbonised beads.

For the production of material other than mesoporous activated carbon, e.g. ion exchange material, the above sequence of steps may be terminated after washing the beads. For the treatment of materials other than resin beads e.g. coconut-derived or other vegetable materials, the heat treatment, carbonization and activation steps are performed.

Mixing and Dispersion

It will be appreciated that the polymerizable liquid precursor sees two mixing operations, firstly mixing of its component streams 114, 122 (FIG. 5) in a first mixer and secondly dispersion of the resulting mixed stream 126 into the dispersion medium in a second mixer 418. Similarly the dispersion medium also sees two mixing operations, firstly mixing of a third dispersing agent stream 134 with a fourth dispersant stream 140 in a third mixer 146 and secondly dispersion within it of the polymerizable liquid precursor stream in the second mixer 148. The duty performed by the first and third mixers is to homogeneously mix components derived from separate incoming streams whereas the duty performed by the second mixer is to create a dispersion of the polymerizable liquid precursor as disperse phase in the dispersion medium as continuous phase.

Gradual heating of the polymerizable liquid precursor either before or after formation of the combined stream with the liquid suspension medium is not desirable because increase in viscosity and agglomeration of polymerised material are difficult to avoid. The combined stream entering the mixer 148 is desirably at a temperature as close as possible to that of the designed polymerization temperature for column 152 but limited by the rate at which the combined stream polymerizes. In some embodiments it is preferably not more than 120° C. as fixed by the polymerization rate of the combined stream. The height of the column 152 is in practical embodiments considerable e.g. about 6 meters, and the skilled designer will wish to make it no higher than is necessary to enable polymerization of descending beads to reach completion or at least for the beads to have become hardened against agglomeration by the time that they leave the column. Although the column 152 is heated, that is primarily to maintain the polymerization temperature within the column rather than to heat the dispersion entering the column to the designed polymerization temperature. In embodiments the designed temperature of the column 152 is 150° C., the dispersion medium leaving heat exchanger 144 is designed to be at that temperature, and the temperature of the streams 114, 122 combining and entering mixer 128 is designed to be approximately 120° C. as defined by the reactivity of the mixed feed stream. The designer may have an incentive to keep mixer 128 relatively cool to minimize polymerization problems within it. However, the extent to which this is feasible in some embodiments is limited by the need not to unduly cool the stream entering mixer 148 and polymerization column 152. The stream 126 cools the material in stream 142 with which it becomes combined, but only to a limited extent because the flow rate in stream 142 is a multiple of that in stream 126. The combined stream entering mixer 148 already contains precursor that has began to polymerize rapidly because it is already at or close to the designed polymerization temperature, and it will be appreciated that this places severe constraints on the time that for which the stream can be resident in mixer 148 and within which dispersion can be completed.

It has been found that both the mixing and the dispersion duties can be performed using in-line static mixers. They have no moving parts, are powered by pressure difference and operate by radial transport of fluid streams passing through them and by dividing the fluid streams into multiple partial streams which are then recombined. Such mixers may be based on a tubular casing having two or more grids of elements arranged at angles to the longitudinal axis of the casing and to each other so that each intersects the other, the grids optionally being configured in relatively short axial sections each defining a mixing stage and differing from adjacent sections e.g. in rotational position of the mixing elements and/or in configuration of the mixing elements, see GB-A-2061746 (Streiff, Sulzer) and US 2004/0125691 (Streiff et al.), the disclosures of which are incorporated herein by reference. More details on in-line static mixers may be found in *Sulzer Technical Review*, March 1977, 108-113 and Streiff et al., *Recents Progres en Genie de Procedes*, 11, 307-314 (1997), the disclosures of which are also incorporated herein by reference. They are significantly better than mixing valves, orifices or perforated plates which are well-known for producing dispersions but which have the disadvantages of unduly wide droplet size distribution and poor efficiency. In-line static mixers typically have an open area of more than 50% e.g. more than 70%, which significantly reduces the likelihood of material agglomerating within them and leading to blockage. Further information about a four-element Kosch-Glitsch XMX static mixer is given by J. M. Zalc et al., *Polymer Engineering and Science*, 43, No 4, 75-889, the disclosure of which is incorporated herein by reference.

It will be appreciated that these mixers are of complex internal construction and flow pattern, and that it may not always be appropriate to use simple descriptions such as laminar or turbulent to describe the flow regimes within them, especially as such flow regimes will be affected by the flow rates at which the mixers are operated. Some manufacturers regard flows through in-line static mixers with Reynolds numbers <200 as being laminar, 200-500 as being transition laminar, 500-2100 as transition turbulent and >2100 as being turbulent. When dispersing one liquid in another, Reynolds number has implications for droplet size because it measures the scale within a liquid or multi-liquid steam where viscous forces become comparable to inertial forces and provides an indication of the size of the smallest eddies that can exist in a stream and hence the size of the droplets likely to be formed in the stream.

Figure 4:
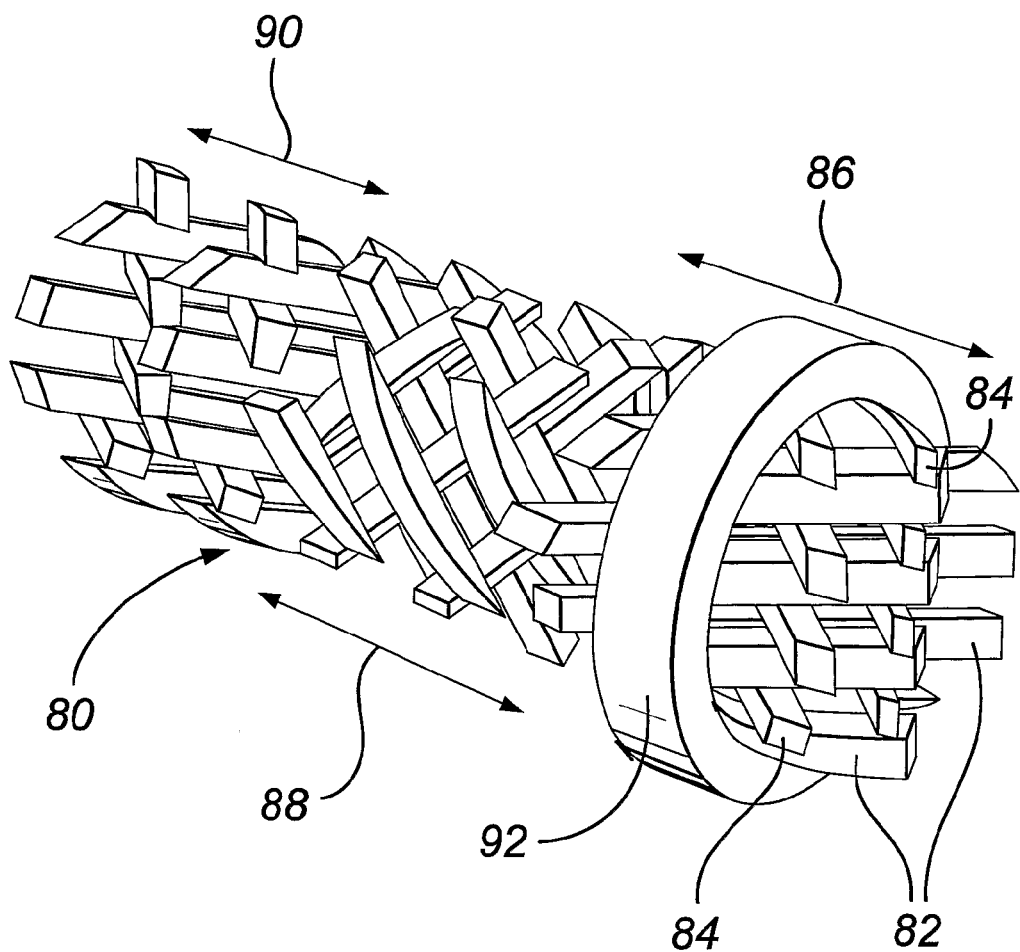
FIG. 4 is a perspective view of the mixing elements of an in-line mixer forming part of the apparatus of FIGS. 1 and 2 additionally showing a short length of the mixer casing.

FIG. 4 shows the active elements of a mixer of this type. The mixing element 80 comprises mixing bars 82, 84 grouped together in grids of, in this instance, four parallel bars, each grid being angled relative to the longitudinal axis of the mixer and with the bars interfitting and intersecting as shown. Pairs of intersecting bars occur in relatively short longitudinal groups 86, 88, 90 with the groups being rotated relative to adjacent groups e.g. at 90°. The mixing element 80 fits into a casing, a short length of which appears at 92, but which is elsewhere cut-away to reveal the mixing element. The fluid is split into individual streams in the open intersecting channels of each mixing element, and at each intersection a part of the flow is sheared off into the crossing channel. In this way, inhomogeneities are evened out two dimensionally in the first element and three-dimensionally in the second element. In the case of a mixer acting as a disperser the thin plates of the mixing element first subdivide the flow. When a drop passes into the interfacial area of the intersecting channels, it is subjected to dynamic pressure variations owing to the velocity components being displaced through 90°, and becomes deformed as a result. If its diameter exceeds a critical value, the drop breaks up.

With reference to the static mixer 148 that disperses the polymerizable liquid precursor in the dispersion medium, for a given set of fluid physical properties, the main influence on the drop size produced by a static mixer is the specific energy dissipation rate, which is in turn controlled by the mixer geometry and fluid velocity.

$$\text{Pressure drop} = \Delta P = \frac{\rho u^2}{2} f_D \frac{L}{D} \qquad \text{Equation 1}$$

$$\text{Specific energy dissipation rate } \varepsilon = \frac{Q\Delta P}{M} = \frac{\pi D^2}{4} u \frac{\rho u^2}{2} f_D \frac{L}{D} \frac{4}{\pi D^2 L \rho} = \frac{u^3 f_D}{2D} \qquad \text{Equation 2}$$

where

| | | |
|---|---|---|
| D | pipe diameter | m |
| $f_D$ | Darcy friction factor | — |
| L | mixer length | m |
| M | mass | kg |
| P | pressure | Pa |
| Q | volumetric flowrate | $m^3 s^{-1}$ |
| u | velocity | $m s^{-1}$ |
| ϵ | energy dissipation rate | $W \cdot kg^{-1}$ |

The dissipation rate calculated is an average over the whole mixer, although there will be local variations within the mixer with the peak rate perhaps ten times the minimum. This is considerably more uniform than a stirred tank, where the peak dissipation rate may be many hundreds of times higher than the minimum. However, this non-uniformity of energy dissipation means that the mixer has to be long enough to ensure that all the dispersed phase fluid has passed through regions of high dissipation for the desired drop size to be reached.

According to a more developed theory by Streiff et al., 1997, supra, the turbulent dispersion process is governed by the ratio of the stress forces outside the particle to the surface forces inside the drop. This ratio is controlled by the Weber number, We. This ratio must exceed a critical value for drop break up to occur. For the largest stable drop with a diameter $d_{max}$, We=$We_c$. The stress forces are created by turbulent eddies of size $l_e$=0.1/$D_h$ where $P_h$ is the mixer hydraulic diameter—in the case of the second embodiment—~1.5 mm. microscale of turbulence. Drops with a size of $l_k$ are then simply transported with these eddies and do not undergo any further break up where:—

$$l_k=(v_c{}^3/\epsilon)^{0.25} \qquad (3)$$

where $v_c$ is the continuous phase kinematic viscosity. As such $l_k$ is the smallest drop size than can be created. In one embodiment this is in the range of 40-60 microns.

Drops therefore break, according to this model if:—

$$l_k<d_{max}<l_e \qquad (4)$$

The specific energy dissipation, ϵ, is a function of the mixer design and the flow velocity and is given by:—

$$\varepsilon = \frac{f \cdot V_s^3}{2 \cdot \theta^3 \cdot D_h} = \frac{Ne \cdot V_s^3}{\theta \cdot D_t} \qquad (5)$$

where f is the friction factor, $V_s$ is the superficial liquid velocity (m/s), θ is the mixer void fraction, Ne is the Newton number and $D_t$ is the mixer tube diameter. For operating conditions in one embodiment this provides for a minimum bead size of between 20 and 40 microns.

The distribution of energy dissipation within a mixer is a function of local velocity variations created by the turbulence. This is not uniform and therefore the drop sizes vary. However in a static mixer points of lower and higher energy dissipation are regularly distributed and all the flow passes through these regions. Accordingly, the energy distribution and the resulting bead size distribution should be far more uniform that in a stirred tank or a dynamic in-line mixer provided that the mixer length is sufficient. The nature of the inline mixers is such that fully developed turbulence and mixing occurs at much lower Reynolds numbers than in empty tubes or stirred tanks, typically for an SMV mixer at $Re_{Dh}$>200 (Reynolds number calculated based on the hydraulic diameter). Studies have shown that in an SMV mixer a homogeneous energy distribution is achieved in a large part of the mixer volume for $Re_{Dh}$~30000 which is significantly higher than achieved in the current L2 trials. Under these circumstances Hinze demonstrated that the largest stable drop size in isotropic turbulent flow was given by:—

$$d_{max} = \left(\frac{We_c}{2}\right)^{0.6} \left(\frac{\sigma}{\rho_c}\right)^{0.6} \varepsilon^{-0.4} \qquad (6)$$

where σ is the interfacial tension and $\rho_c$ is the continuous phase density. The main problem with applying this theory is that $We_c$ is a function of $d_{max}$ which precludes direct calculation of $d_{max}$:—

$$We_c = \frac{\rho_c V^2 d_{max}}{\sigma}$$

In addition the mixer length and flow velocity were varied. The basis for the evaluation was that the theory was more specifically related to the maximum stable drop size rather than $d_{sv}$, the Salter mean diameter. This equation was subsequently modified to allow for variations in the density between the continuous and dispersed phase (specifically for gas-liquid systems where the variation is significant although it is now also used for liquid-liquid systems)

$$d_{max} = \left(\frac{We_c}{2}\right)^{0.6} \left(\frac{\sigma}{\rho_c}\right)^{0.6} \left(\frac{\rho_c}{\rho_d}\right)^{0.2} \varepsilon^{-0.4} \quad (7)$$

Calabrese then showed that the viscosity of the drop can also influence the dispersion process as $We_c$ is only directly applicable to a low viscosity disperse phase. The liquid within the drop is in circulation due to the external pressure distribution that gives rise to internal sheer forces that tend to stabilise the drop and reduce drop break up. This lead to the introduction of a viscosity number Vi that modifies the critical Weber number:—

$$We_c^{\#} = We_c((1 + B \cdot Vi))$$

where:—

$$Vi = \left[\frac{\eta_d (\varepsilon \cdot d_{max})^{0.33}}{\sigma}\right] \left(\frac{\rho_c}{\rho_d}\right)^{0.5} \quad (8)$$

This leads to an equation for $d_{max}$ $$d_{max} = C_n \left(\frac{(1 + BV_i)We_c}{2}\right)^{0.6} \left(\frac{\sigma}{\rho_c}\right)^{0.6} \left(\frac{\rho_c}{\rho_d}\right)^{0.1} \varepsilon^{-0.4} \quad (9)$$

These drop size equations are however only valid for dilute disperse phase systems where coalescence does not occur. If the disperse phase fraction is higher it tends to dampen the turbulence in the continuous phase and leads to larger drop sizes. This is given by:—

$$d(\phi_d) = (1 + k\phi_d)d \quad (10)$$

where φd is the disperse phase fraction. Based on a theoretical evaluation Doulah found that k=3 although wide variations have been found in practical studies. The resulting drop size is also an equilibrium between dispersion and coalescence. In regions of low turbulence the drop size increases whilst the smaller drop sizes can be stabilised by dispersants. The overall effect of coalescence and disperse phase fraction cannot be predicted exactly although (9) gives the form of the relationship. This then gives the overall form of the relationship shown in (11);

$$d(\varphi_d) = C_n (1 + k\varphi_d) \left(\frac{(1 + BV_i)We_c}{2}\right)^{0.6} \left(\frac{\sigma}{\rho_c}\right)^{0.6} \left(\frac{\rho_c}{\rho_d}\right)^{0.1} \varepsilon^{-0.4} \quad (11)$$

The constant, $C_n$, in equation (11) provides the means for relating the maximum particle size to the drop size distribution. These are characterized by $d_{10}$, $d_{50}$, $d_{sv}$, $d_{90}$ and $d_{max}$ where $d_{max}$ can be approximated by $d_{99}$. This means that 10%, 50% etc of the drop swarm is in particles of less than the associated drop size. $C_n$ depends on the mixer design and the operating conditions.

This approach again predicted that the mean bead particle size was primarily a function of the interfacial tension between the oil and the resin phases and the linear velocity through the inline mixer but now also brought in the disperse phase properties, which is the main change from the initial approach. The underlying principle did now however allow for the production of smaller beads during the bead break up process.

The mixer 128 for mixing the first and second components streams of the liquid precursor was a Sulzer SMXS mixer, in which the mixing elements are bars. The mixer 146 for homogenizing the inlet oil flow was a Sulzer SMV mixer in which the crossing elements were corrugated plates, but was otherwise generally similar to that shown in FIG. 4. The mixer 148 for dispersing the reaction mixture in the oil was a five element Sulzer SMXL mixer in which the crossing elements were also bars arranged generally similarly to FIG. 4.

In the embodiment of FIG. 4 the stream 114 was of a small molecule cross-linker in a small molecule polar organic solvent and was of viscosity about 3 cP (relatively low, comparable to a flowable liquid such as water) whereas the stream 122 was of a cross-linkable oligomer in the same polar solvent and was of viscosity about 350 cP (comparable to high viscosity motor oil, SAE 40) to give a combined stream of viscosity about 75 cP (comparable to lower viscosity motor oil, SAE 10). A Sulzer SMXS mixer was used as mixer 128 for handling relatively viscous materials and was configured to operate in generally laminar flow conditions. It had a diameter of 6 mm and length 8 cm, was required to handle a maximum flow of about 10 ml/sec at a linear through-flow speed of about 35 cm/sec and at a Reynolds number of 12. These maximum flow conditions corresponded to a pressure drop of about 1 bar across mixer 128 and a residence time of the material flowing through of about 0.2 seconds. In a practical run, the flow rate was 2.5 ml/sec (10 kg/hour) at a linear velocity of about 9 cm/sec and at a Reynolds number of 4 and at a residence time of about 0.8 sec. The material was >30° C. below the intended polymerization temperature (the temperature being selected to ensure that the extent of reaction in mixer 128 was minimized while limiting the temperature decrease of the mixed feed entering the mixer 148) so that its rate of polymerization was relatively low and its residence time under these conditions was such that insignificant polymerization took place within mixer 148. Such polymerization will first become apparent by an increase in viscosity in the stream flowing through the mixer.

The mixer 146 had the duties of firstly mixing a main stream 134 of dispersion medium and a minor stream 140 of dispersant in dispersion medium and secondly smoothing out any thermal irregularities following passage through heat exchanger 144 where the dispersion medium is heated to or close to polymerization temperature. The maximum designed flow of heated dispersion medium through mixer 146 was about 32 ml/sec (118 litres/hour), i.e. more than three times the maximum designed volume flow rate of the liquid precursor, at a linear through-flow speed of about 40 cm/sec. Mixer 146 was of diameter 6 mm and length 8 cm, and was of the Sulzer SMV type configured for turbulent mixing with high mass transfer rate. The heated dispersion medium had a viscosity of only 0.5 cP, and the mixer 146 was designed to operate at a Reynolds number of about 1700 at the maximum designed flow rate which is considered to be within a turbulent transition region, with a pressure drop at maximum flow of only about 0.01 bar. Residence time within the mixer at that flow rate was about 0.2 sec. In a practical experiment the dispersion medium was passed through the mixer 146 at a rate of about 16 ml/sec (50 kg/hour) corresponding to a speed through the mixer of about 20 cm/sec, a residence time of about 0.4 sec and a Reynolds number of 850, although still within the transition turbulent flow region. It will be noted that the weight ratio of the feeds in the precursor and dispersion medium streams was about 5:1, i.e. the dispersion medium is in substantial excess (e.g. in some embodiments >3:1 and in some embodiments within a range 3:1 to 10:1).

The mixer 148 had the duty of dispersing the polymerizable liquid precursor in the liquid dispersion medium. It was a Sulzer SMXL mixer of diameter 10 mm and length 33 mm. The combined stream flows through at a maximum design rate of 42 ml/sec and at a corresponding velocity of about 57 cm/sec giving a corresponding minimum designed residence time of about 0.6 sec and a Reynolds number of about 4600, which is well into the turbulent flow regime. In a practical embodiment, the combined stream flowed through mixer 148 at 18.5 ml/sec corresponding to a linear speed of about 25 cm/sec, a Reynolds number of about 2000 (close to transition to fully turbulent flow) and a residence time of about 1.8 sec. This is insufficient for polymerization to have proceeded substantially within mixer 148, notwithstanding that the stream passing through it is at or close to the designed polymerization temperature within polymerization column 152. Again, undue polymerization within mixer 148 will be first observed by an increase in viscosity of the materials passing through it, and a corresponding increase in droplet size from its intended value. Treatment of the combined stream so as to disperse the polymerizable liquid precursor as droplets in the suspension medium is in some embodiments completed within 0.5-5 secs, e.g. 1-3 secs, more preferably in some embodiments 1.5-2 secs.

Preferably there is used a mixer 148 capable of dispersing the polymerizable resin precursor in the dispersion medium so as to allow the formation of solid particles having a mean particle size of up to 1500 μm, i.e. which permits production of large size beads. For some purposes the operating conditions may be that the average bead size may be higher than this. For example, the operating conditions may be that the mean droplet and hence bead size is up to 2000 μm. In a preferred aspect, the mixer may be used to generate solid particles having a mean particle size of from 100 μm to 1500 μm, preferably from 300 μm to 1000 μm.

It is preferred that the polymerizable precursor is dispersed in the dispersion medium to produce droplets having a relatively narrow particle size distribution so as to produce resin beads that have a similar relatively narrow particle size distribution. Any sample of particulate material will have a statistical distribution of particle sizes about a mean value. The ratio of the $90^{th}$ percentile (D90) to the $10^{th}$ percentile (D10) gives a measure (D90/D10) of the spread of the distribution of particle size in the sample. The droplets and cured resin beads that may be produced according to the present process preferably have a D90/D10 particle size distribution that is nor more than 10, desirably not more than 5, and advantageously about 2. By way of comparison, for coconut charcoal the mean particle size will typically be in the range 100-1000 μm, with a D90/D10 ratio of 20 or more, a significant proportion of the particles being less than 20 μm in size.

The mixer 148, in the embodiment discussed above, has the duty of dispersing a viscous stream of polymerizable liquid precursor e.g. consequent on the presence of oligomers therein (e.g. viscosity >20 cP, e.g. in some embodiments >50 CP) as droplets in a free-flowing stream of dispersion medium (viscosity <2 cP, e.g. in some embodiments <1 cP). This duty has to be completed in the limited residence time in the in-line static mixer which is available before polymerization proceeds too far, and beads of a desired size and desired size distribution have to be produced. As is apparent, the inventors have discovered that these duties can be performed by in-line static mixers and the necessary results can be achieved.

Polymerization Stage

The following conditions are specific to the novolak/hexamine system. The mixed and dispersed liquid precursor mixed and dispersed in the suspension medium is passed direct from the mixer 148 to a region 150, 152 where the flow of dispersion medium becomes laminar and polymerization proceeds rapidly e.g. within a period of 30 seconds to 5 minutes e.g. 1-4 minutes giving hardened beads which can be recovered from the dispersion medium without aggregation and without significant deposition of aggregated material during the polymerization process. In some embodiments, the droplets of reaction mixture are allowed to undergo polymerization in a descending column 152 of the dispersion medium under conditions such that the droplets neither aggregate nor break up and the reaction mixture becomes fully cured to resin by the time it reaches the base of the column so that the resulting beads of resin can be collected and recovered without them aggregating.

For example, in a novolac/hexamine/ethylene glycol system, ethylene glycol which is preferably used as solvent and pore former has a density of 1.1 at room temperature, boils at 197.3° C. at ambient pressure and is immiscible with aliphatic hydrocarbons e.g. transformer oil or other mineral oil used as dispersion medium. As regards reactants, phenol melts at 40.5° C., boils at ambient pressure at 181.7° C. and has a density of 1.07. Paraformaldehyde melts at 120° C. and has a density of 1.45. Industrial novolac resins are typically of density 1.1 or above depending upon molecular weight. Hexamine (hexamethylene tetramine) has a density of 1.3, melts at 238-244° C. and is stated to boil at ambient pressure at 270° C. but decomposes to give reactive cross-linking components at ~120° C., i.e. below the temperature of the mixed reactant/dispersant stream. Cured resin based on phenol and formaldehyde has a density of about 1.1. The density of the starting materials and of the beads of cured resin formed are greater throughout the course of the curing reaction than the density of the mineral oil in which they are dispersed.

It follows that mineral oil can be handled easily at the temperatures needed to effect polymerization which may be up to 160° C., e.g. about 150° C., and that the physical properties of the reactants are such that they can in principle be maintained in dispersion at the required polymerization temperature. If the mineral oil is employed as a gradually descending column 152 with non-turbulent flow, then dispersed droplets of reaction mixture will fall under gravity through the oil and will descend at a speed greater than the speed of descent of the oil. The speed of descent of the dispersed droplets will depend on droplet size and the viscosity of the oil, but their average speed of descent may be at least twice the speed of descent of the oil e.g. 5-20 times the speed of descent of the oil. For example the column 152 may be of height 5-10 metres e.g. about 6 metres, and the speed of the oil may be such that on average it will descend the length of the column in about 30-60 minutes. It will be appreciated that the dispersed reaction mixture forms a population of droplets having different sizes, and that the largest droplets will descend the more rapidly. The conditions e.g. of oil viscosity and column height are desirably such that the largest droplets become cured during their descent down the column and that uncured droplets do not reach a receiving vessel at the base of the column where if incompletely cured they might adhere together and form objectionable aggregates. The speed of descent of the droplets may, for example, be such that they will descend the length of the column in more than 2 minutes e.g. about 4-5 minutes which is a sufficient time for the polymerization reaction to reach completion.

It has been found that droplets of reaction mixture can be cured in such a column in a residence time of 30 seconds-5 minutes, e.g. 1-4 minutes, more preferably 2-4 minutes with development of good mesoporosity in the resulting resin which remains apparent in carbonized material subsequently derived from the resin.

Resins and their Utility in Forming Carbonized Materials

The invention is applicable to the formation of polymerized beads from any polymerizable liquid reaction mixture that can be dispersed into an immiscible liquid dispersion medium and hardened or cured as droplets whilst in suspension in or travelling through a laminar flow of said medium. It is applicable to reaction mixtures as aforesaid that contain a pore former in an amount effective to impart mesoporosity to beads formed from the dispersed droplets by polymerization.

It is applicable to the production of resin beads useful inter alia as intermediates in the production of beads of carbonized material and also e.g. as ion-exchange materials. Examples of carbonizable organic resins that can be converted to carbon materials include hydroxyl-substituted aromatic resins and non-phenolic resins such as those derived from styrene and vinyl pyrolidone or from styrene and divinyl benzene. Hydroxy-substituted aromatic resins are preferred, especially those derived from phenols.

The invention specifically includes a process for producing a porous carbon material comprising the steps of condensing a nucleophilic component with an electrophilic cross linking agent in the presence of a pore former to form a resin, carbonising the resin and activating the resulting carbon material.

Phenolic Resins—Nucleophilic Component

The present resins can be prepared from any of the starting materials disclosed in WO 02/12380. Nucleophilic components may comprise phenol, bisphenol A, alkyl phenols e.g. cresol, diphenols e.g. resorcinol and hydroquinione and aminophenols e.g. m-amino-phenol.

It is preferred to use as nucleophilic component a novolac or other oligomeric starting material which because it is already partly polymerized makes the polymerization to the desired resin beads a less exothermic and hence more controllable reaction. The preferred novolacs have weight-average molecular weights (Mw) in the range of from 300 to 3000 prior to cross-linking (corresponding to a DP with respect to phenol of about 3-30). Where novolac resins are used, they are solids with melting points in the region of 100° C. Novolac resins of Mw less than 2000 and preferably less than 1500 form resins which, on carbonisation, tend to produce carbons with desired pore size distributions using lower amounts of pore former. Whilst commercial novolacs are largely produced using phenol and formaldehyde, a variety of modifying reagents can be used at the pre-polymer formation stage to introduce a range of different oxygen and nitrogen functionalities and cross-linking sites. These include but are not limited to:—

(a) Diphenols e.g. resorcinol and quinines e.g. hydroquinone. Both are more reactive than phenol and can lead to some cross-linking at the pre-polymer production stage. It is also possible to introduce these compounds at the cross-linking stage to provide different cross-linking paths. These also increase the oxygen functionality of the resins.

(b) Nitrogen containing compounds that are active in polycondensation reactions, such as urea, aromatic (aniline, m-amino phenol) and heteroaromatic (melamine) amines. These allow the introduction of specific types of nitrogen functionality into the initial polymer and final carbon and influence the development of the mesoporous structure of both the resins and the final carbons. Like hydroquinone and resorcinol, all the nitrogen containing nucleophilic modifying reagents which can be used possess two or more active sites and are more reactive in condensation reactions than phenol or novolacs. It means that they are first to react with primary cross-linking agents forming secondary cross-linking agents in situ.

Novolacs are thermally stable in that they can be heated and cooled repeatedly without structural change. They are cured on addition of cross-linking agents and heating.

The nucleophilic component may be provided alone or in association with a polymerization catalyst which may be a weak organic acid miscible with the novolac and/or soluble in the pore former e.g. salicylic acid, oxalic acid, phthalic acid or p-toluenesulfonic acid (but preferably not for resins intended to be carbonized as the addition of sulphur-containing compounds is undesirable). The salicylic acid as supplied is 1.5%, and if desired the amount may be increased to 2.5% or beyond.

The concentration of novolac in the pore former is such that when combined with the solution of cross-linking agent in the same pore former the overall weight ratio of pore former to (novolak+crosslinking agent) is at least 125:100 by weight. The actual ratios of novolak:pore former and crosslinking agent:pore former are set by the operation of the plant and are controlled by the viscosity of the novolac:pore former solution such that it remains pumpable and the ratio of crosslinking agent:pore former such that the crosslinking agent remains in solution throughout the plant.

Cross-Linking Agents for Phenolic Resins

The cross-linking agent is normally used in an amount of from 5 to 40 parts by weight (pbw) per 100 parts by weight of the nucleophilic components e.g. novolac, typically from 10 to 30 (e.g. 10, 15 or 20) pbw cross-linking agent per 100 pbw of nucleophilic component. It may be, for example, an aldehyde e.g. formaldehyde or furfural or a polyamine e.g. hexamethylenetetramine (hexamine), melamine or hydroxymethylated melamine.

Hexamine is preferably used for cross-linking novolac resin at a concentration of 10 to 25 e.g. about 20 pbw hexamine per 100 pbw of Novolac. This ensures formation of the solid resin with maximal cross-linking degree and ensures the stability of the mesopore structure during subsequent removal of the pore former. This is in contrast to previously disclosed sintered resin structures which typically require up to 3 pbw of hexamine per 100 pbw of novolac.

Pore-Formers

The pore former also acts as solvent. Thus, the pore former is preferably used in sufficient quantities to dissolve the components of the resin system, the weight ratio of pore former to the total components of the resin system resin being preferably at least 1.25:1. It preferably comprises a polar organic liquid chosen in combination with the dispersant which is a non-polar organic liquid so as to form a mainly or wholly immiscible combination, the greater the incompatibility between the pore former which forms the dispersed phase and the dispersion medium, the less pore former becomes extracted into the dispersion medium. The pore former desirably has a greater density than the dispersion medium with which it is intended to be used so that droplets of the pore former containing dissolved resin-forming components will pass down a column more rapidly than a descending flow of dispersion medium therein. Both protic and aprotic solvents of different classes of organic compounds match these requirements and can be used as pore formers, both individually and in mixtures. In addition to dissolving the reactive components and any catalyst, the pore former should also, in the case of phenolic resins, be compatible with water which is formed by elimination as polymerization proceeds, and the pore former is preferably highly miscible with water so that it can be readily removed from the polymerized resin beads by washing.

Details of suitable pore formers are given in WO 02/12380 A2 (Tennison). The pore former may be, for example, a diol, a diol-ether, a cyclic ester, a substituted cyclic or linear amide or an amino alcohol e.g. ethylene glycol, 1,4-butylene glycol, diethylene glycol, triethylene glycol, γ-butyrolactone, propylene carbonate, dimethylformamide, N-methyl-2-pyrrolidinone and monoethanolamine, ethylene glycol being preferred, and where the selection is also limited by the thermal properties of the solvent as it should not boil or have an excessive vapour pressure at the temperatures used in the mixer or curing column.

It is thought that the mechanism of mesopore generation is due to a phase separation process that occurs during the cross-linking reaction. In the absence of a pore former, as the linear chains of pre-polymer undergo cross-linking, their molecular weight initially increases. Residual low molecular weight components become insoluble in the higher molecular weight regions causing a phase separation into cross-linked high molecular weight domains within the lower molecular weight continuous phase. Further condensation of light components to the outside of the growing domains occurs until the cross-linked phase becomes essentially continuous with residual lighter pre-polymer trapped between the domains. In the presence of a low level of pore former the pore former is compatible with, and remains within, the cross-linked resin domains, (e.g., <120 parts/100 parts Novolac for the Novolac-Hexamine-Ethylene Glycol reaction system), whilst the remainder forms a solution with the partially cross-linked polymer between the domains. In the presence of higher levels of pore former, which exceed the capacity of the cross-linked resin, the pore former adds to the light polymer fraction increasing the volume of material in the voids between the domains that gives rise to the mesoporosity. In general, the higher the pore former content, the wider the micropores and the higher the pore volume.

This phase separation mechanism provides a variety of ways of controlling the pore development in the cross-linked resin structures. These include chemical composition and concentration of the pore former; chemical composition and quantity of the cross-linking electrophilic agents, presence, chemical nature and concentration of modifying nucleophilic agents, chemical composition of phenolic nucleophilic components (phenol, novolac), presence, chemical nature (acidic, basic), the presence of water within the solvent and concentration of any curing catalyst if present.

Dispersion Medium

The dispersion medium is a liquid which can be heated to the temperature at which curing is carried out e.g. to 160° C. without boiling at ambient pressure and without decomposition and which is immiscible with ethylene glycol and with the dissolved components therein. It may be hydrocarbon-based transformer oil which is a refined mineral oil and is a by-product of the distillation of petroleum. It may be composed principally of $C_{15}$-$C_{40}$ alkanes and cycloalkanes, have a density of 0.8-0.9 depending upon grade and have a boiling point at ambient pressure of 260-330° C., also depending upon grade. Transformer oil has a viscosity of about 0.5 poise at 150° C. which is a typical cure temperature. As previously explained, transformer oil or other dispersion medium is typically used in volumes 3-10 times the volume of the combined streams of nucleophilic precursor and crosslinking agent e.g. about 5 times.

Dispersing Agents

Preferred dispersing agents which are dispersed in the dispersion medium before that medium is contacted with the reaction mixture to be dispersed therein to retard droplet coalescence are either sold as drying oils e.g. Danish oil or are produced by partially oxidizing naturally occurring precursors such as tung oil, linseed oil etc. The dispersing agents are consumed as the process proceeds, so that if the dispersion medium is recycled, dispersing agent in the recycled oil stream should be replenished. The dispersing agent is conveniently supplied as a stream in solution in the dispersion medium e.g. transformer oil and e.g. in an amount of 5-10% v/v where Danish oil is used which contains a low concentration of the active component. More solution would be used of the oxidised oils.

An embodiment uses a version of Danish Oil as the dispersant which is a proprietary wood treatment/varnish that comprises Tung oil dispersed in kerosene with curing agents (siccatives) such as cobalt ethyl hexanoate and other unidentified resin components. It is preferred that there should be present a naturally occurring oil that has been oxidized to a controlled extent. Controllable dispersion performance has been achieved with Tung oil and linseed, both conventional drying oils, and food grade oils such as soya, sunflower and rapeseed, the latter simply requiring more severe oxidation conditions to render them effective e.g rapeseed oil may require 3 or more days for optimal performance Preferred Combination of Resin-Forming Materials The preferred resins for use in producing porous carbon materials are novolak resins cross-linked with hexamethylene tetramine (hexamine) in ethylene glycol as pore forming agent with Danish oil as dispersant in transformer oil as dispersion medium.

Preferred Apparatus and its Use

In a second embodiment of the apparatus of FIG. 1, a feed tank or vessel 10 for one component of the polymerizable liquid precursor e.g. hexamine in ethylene glycol was provided with stirrer 12. Hexamine/ethylene glycol solution was formulated on site by adding solid hexamine, supplied by Plater Chemicals, to ethylene glycol in the vessel 10 and stirring until the hexamine dissolved. The vessel was pressurised e.g. to about 3 bar and was maintained originally at 90° C. by an external steam jacket, but this was increased to 110° C. after an initial run. The first component passed from the tank 10 via flow control valve 16 through line 14 which was not heated. Initially the feed tank 10 was pressurized to the required level and then left, leading to a slow depressurization as the tank emptied. Pressure forced flow was used in preference to a pump to avoid any pulsations in the flow that might have impacted on the performance of in-line mixers 28, 48 located downstream. A feed tank 18 for a second component of the polymerizable liquid precursor e.g. novolac in ethylene glycol was provided with stirrer 20, was pressurised to about 3 bar to provide pressure forced flow and was also maintained originally at 90° C. by an external steam jacket.

In use, novolac was supplied as a 65% w/v solution of TPR210 resin in ethylene glycol by Hexion Ltd in 1 m³ stainless steel steam heated IBC's. The TPR210 contained 1.5% free salicyclic acid which serves as curing catalyst. There was purchased 20 m³, representing a single production batch. Vessel 18 was replenished with this feed as required This component passed from the tank 18 via line 22 in which there was a second flow control valve 24. The line 22 was electrically trace heated to 80° C. for part of its length to prevent the novolac from setting in the line. The second component comprising hexamine dissolved in ethylene glycol was prepared in vessel 10 by dissolving solid hexamine in the ethylene glycol at a concentration sufficient to give the required resin:solvent ratio in the combines stream. This component passed from vessel 10 via line 14 through control valve 16. This line was heated to ~80° C. to prevent hexamine recrystallizing. The volumes of vessels 10, 18 were 7 m³ and approximately 5 m³ of each feed was prepared. The two flows 14, 22 were independently controlled using hand control valves 16, 24 via mass flow meters, were combined in line 26 and were supplied to first in-line mixer 28 where they were intimately mixed under turbulent flow conditions to form the polymerizable liquid precursor.

Transformer oil to provide a continuous phase into which the polymerizable liquid precursor was to be dispersed was stored in supply tank 30 with stirrer 32, again under a pressure of about 3 bar for pressure forced flow, and passed through line 34. A small flow of dispersant e.g. 8% v/v Danish oil in transformer oil from feed tank 36 was supplied continuously by pump 38 via line 40 to the transformer oil in line 34. The dispersant was consumed during the polymerization reaction, and therefore had to be replenished as the transformer oil was recirculated. The combined flow of transformer oil and dispersant flowed through line 42 to a tubular pre-heater 44 where it was heated to ~145° C. and then to in-line mixer 46 where the dispersant and the transformer oil mixed under turbulent flow conditions.

The streams of polymerizable liquid precursor and transformer oil/dispersant were combined and fed to main mixer assembly 46, 48 via a sparged injector that comprised initial a 1 cm pipe with 4×2 mm holes. Recycled hot oil entered upper in-line mixer 46 that ensured that the oil and dispersant were thoroughly mixed. The resulting stream, e.g. at a flow rate in the range from 600 to 1000 L/hour, was combined with the mixed feed stream, e.g. at a flow rate in total of between 100 and 200 L/hour. The combined stream passed to main bead dispersion mixer 48 which was a "dip leg" mixer 48 partially immersed in the hot oil at the relatively large diameter head region 50 of polymerization column 52. The in-line mixer 48 dispersed the polymerizable liquid precursor as droplets of size about 500 μm and had the property that it created a population of droplets having a relatively narrow range of sizes. Oil level in head region 50 was monitored by level sensor 49. The total flow, comprising dispersed beads in the carrier oil, was then passed down the polymerization column 52 to collection vessel 54.

When the transformer oil containing the polymerizable liquid precursor passed from the mixer 48 into the body of oil in the head region 50 of polymerization column 52, its velocity decreased and turbulence was lost. It then passed in a descending flow down polymerization column 52 which was of length e.g. 6 meters and was heated by a heating jacket to maintain the material therein at a suitable polymerization temperature e.g. 140° C. Flow of transformer oil down the column 52 was laminar. As used herein, the term "laminar flow" refers to a flow regime in which fluid motion is smooth and orderly, and in which adjacent layers or laminae slip past each other with little mixing between them. Typically, a laminar flow regime exists when the Reynolds Number is below 2000. Laminar flow conditions minimized collisions between the droplets of polymerizable liquid precursor as they flowed down the column 52 and hence minimized aggregation of the droplets; these conditions also minimized break-up of the droplets.

The length of the column 52 and the temperature at which it was maintained were configured to allow the dispersed polymerisable liquid precursor or at least a substantial proportion thereof, to cure before reaching the collection vessel 54 so as to minimize agglomeration of the resulting particles or beads. The column 52, shown schematically in FIG. 2, had a capacity of ~500 litres such that the oil residence time in the column was around 30 minutes at 1000 L/h flow rate. In contrast, gravitational settling of the droplets or beads which, as explained above, were denser than the transformer oil gave a residence time for 500 μm beads of about 4 minutes—i.e. the beads had a high velocity (0.025 m/s) relative to the oil flow rate (0.003 m/s) within the polymerization column 52. This was in marked contrast to the situation within the in-line mixer 48 which had a free volume of around 400 ml, giving a residence time of approximately 1.5 seconds (0.4 m/s). Owing to the short residence times within mixers 28,48 polymerization of the reaction mixture passing through them does not proceed significantly, and owing also to the flow conditions within the mixers, unintended viscosity increases and fouling by aggregated polymerized reaction mixture were not observed. Studies indicated that at 140° C. the beads became fully cured in ~2 minutes under flash cure conditions, and it was found that this flash cure could be carried out whilst producing beads of useful mesoporosity that could subsequently be converted into mesoporous/microporous carbon beads.

In use the collection vessel 54, was largely filled with oil. It was then pressurised to push the oil back up the column 52 so that the static oil head was balanced by the pressure to give a controlled level in the head region 52 of the column as represented by the line across the upper polymerization column region 50 shown in FIG. 1 and a residual level represented by the line across the collection vessel 54 as in FIG. 1. To further assist in controlling the levels in column 52 the initial design comprised a "lute line" shown by the hair pin pipe 63 between the recycle pump 58 and intermediate product receiving vessel 62. This was intended to function like a siphon tube, maintaining the correct level in the head region 50 whilst oil was being pumped around the circuit. It was also intended that the bead slurry pump 58 could be used to recycle the slurry from the lute line 63 back to the receiver vessel to provide an enhanced linear velocity in line 63 to lift the beads up the "lute line".

Cured polymer beads from the column 52 passing to collection vessel 54 were maintained in suspension by stirrer 56. Material from collecting vessel 54 was intended to pass via pump 58 and line 60 to first holding vessel 62 where the beads were maintained in suspension by stirrer 64 and the bead suspension was allowed to cool. In practice, however, it proved difficult to pump the bead suspension using the pump 58, and instead pressure forced flow based on the pressure in collecting vessel 54 was used instead. After cooling, material was passed from intermediate vessel 62 to holding tank 70 where the beads were maintained in suspension by stirrer 68 with continuous recirculation via pump 72, and the material was thence passed to centrifuge 74. Beads substantially free of transformer oil were passed e.g. to a storage container 76 and separated oil was returned at line 78 to the vessel 30.

Figure 2:
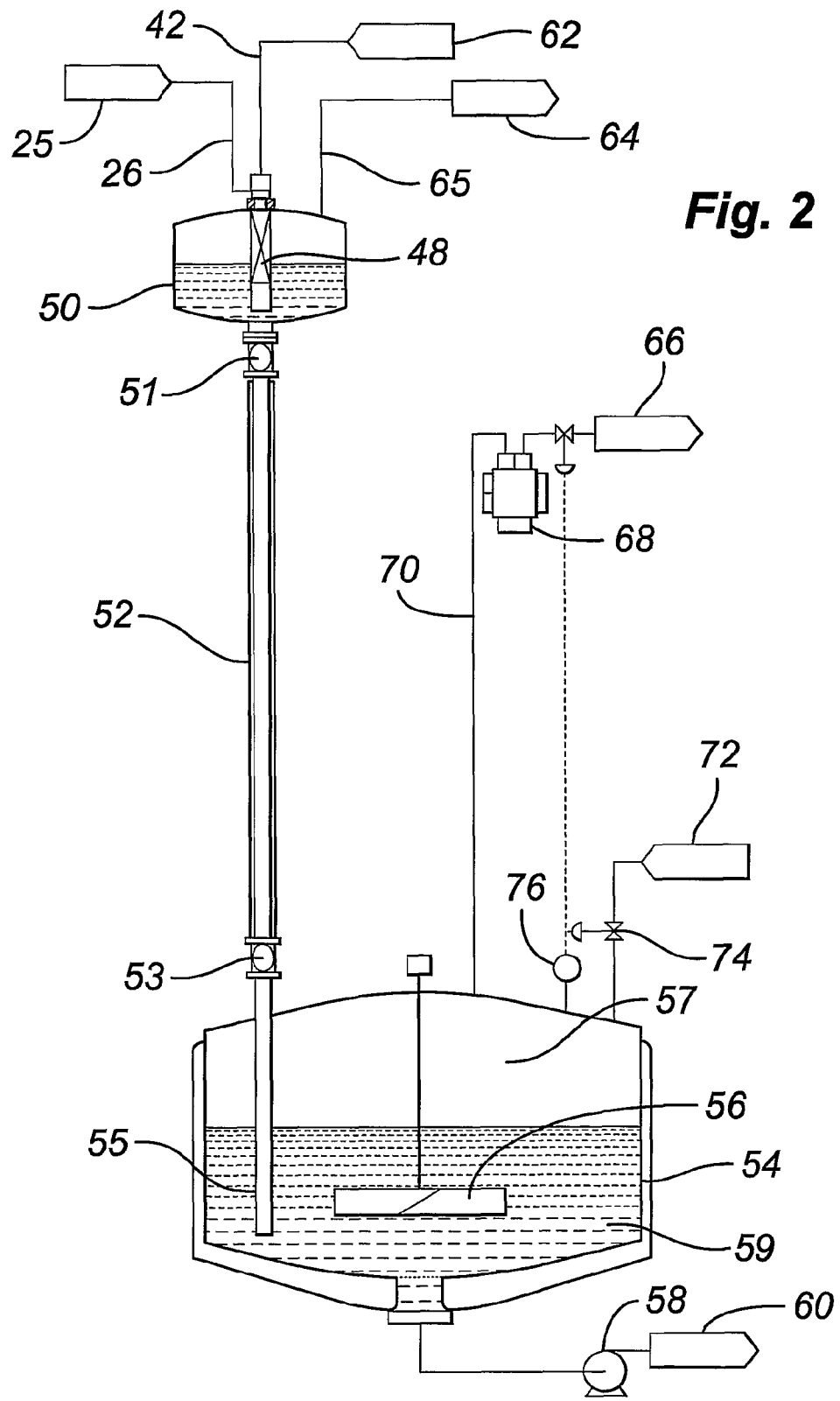
FIG. 2 is a schematic diagram of a polymerization column assembly forming part of the apparatus of FIG. 1.

The column arrangement 50, 52 and collection vessel 54 are shown in more detail in FIG. 2. Reaction mixture 25 in line 26 and transformer oil 62 in line 42 passed to mixer 48 which was arranged to discharge into in the headspace 50 which appears as a chamber which had a bottom opening into the column 52 but was otherwise closed. Auxiliary line 65 allowed venting of gas 64 from the upper region of headspace 50. The column 52 incorporated sight glasses 51, 52 and terminated in downpipe 55 which discharged into collection vessel 54 below the level of liquid 59 in the vessel. The headspace 57 could be purged with inert gas e.g. nitrogen from supply 72 via valve 74 and port 76. Pressurizing the headspace 57 at start-up established the level of transformer oil in the column 52 and head region 50, and the liquid level in collection vessel 54 was desirably maintained so that at any time by release of pressure the column of transformer could return into the vessel 54.

Once removed from the product collection vessel 76, the beads were vacuum dried. Laser particle size analysis was carried out on the particulate product. Residual levels of glycol and oil were measured by thermogravimetric analysis. The particles were examined by scanning electron microscopy.

The particle size of vacuum dried resin samples was determined using a Malvern Masterisizer (Laser diffraction). The dry sample was fed into a small vibrating hopper and then through a small perforated basket in an essentially fluidised state. The first part of the sample gave a "typical" result and a second part of the sample was used to ensure that the results were reproducible and could also be re-run to confirm reproducibility and that there was no sample attrition. The unit itself effectively decided when it had seen sufficient time to report the particle size distribution, i.e. when the results had converged. The resin sample was run as received and was not dispersed prior to testing.

Dispersion of the main particle peak size gave a $D_{10}$:$D_{90}$ of approximately 2.

Figure 3:
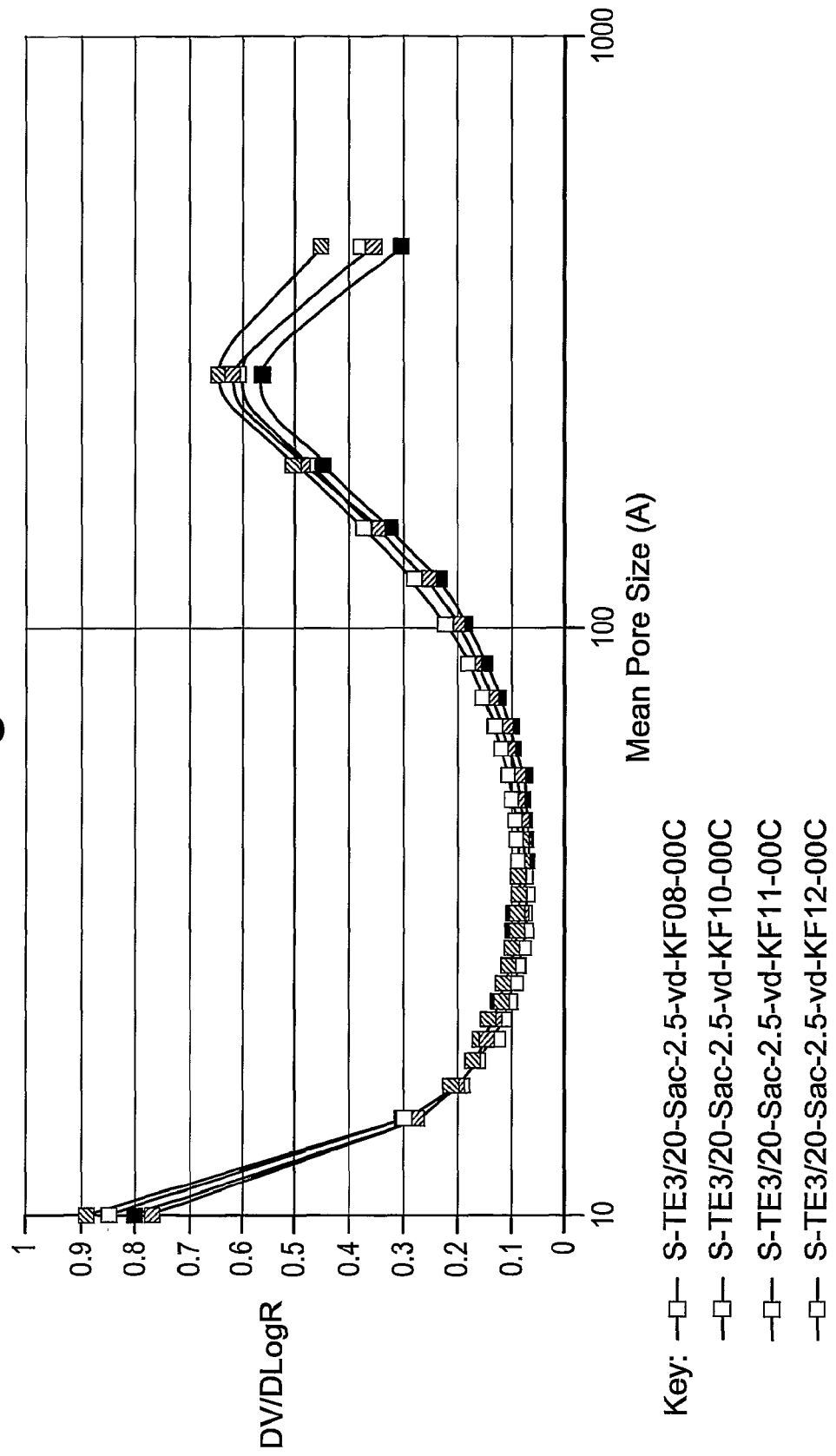
FIG. 3 shows the pore size distribution data of four samples of resin prepared by the method of the invention (DV/D Log R versus mean pore size (A))

Samples for pore structure analysis were fully vacuum dried and were then carbonised in a single run in a large box furnace. The results are summarised in FIG. 3 and Table 1. All of the samples show essentially identical pore structure.

TABLE 1

| Sample | BET Area $m^2/g$ | Pore volume cc/g | Bulk density $g/cm^3$ |
|---|---|---|---|
| BX8 | 563 | 0.66 | 0.55 |
| BX10 | 552 | 0.70 | 0.50 |
| BX11 | 553 | 0.70 | 0.54 |
| BX12 | 578 | 0.76 | 0.52 |

Figure 5:
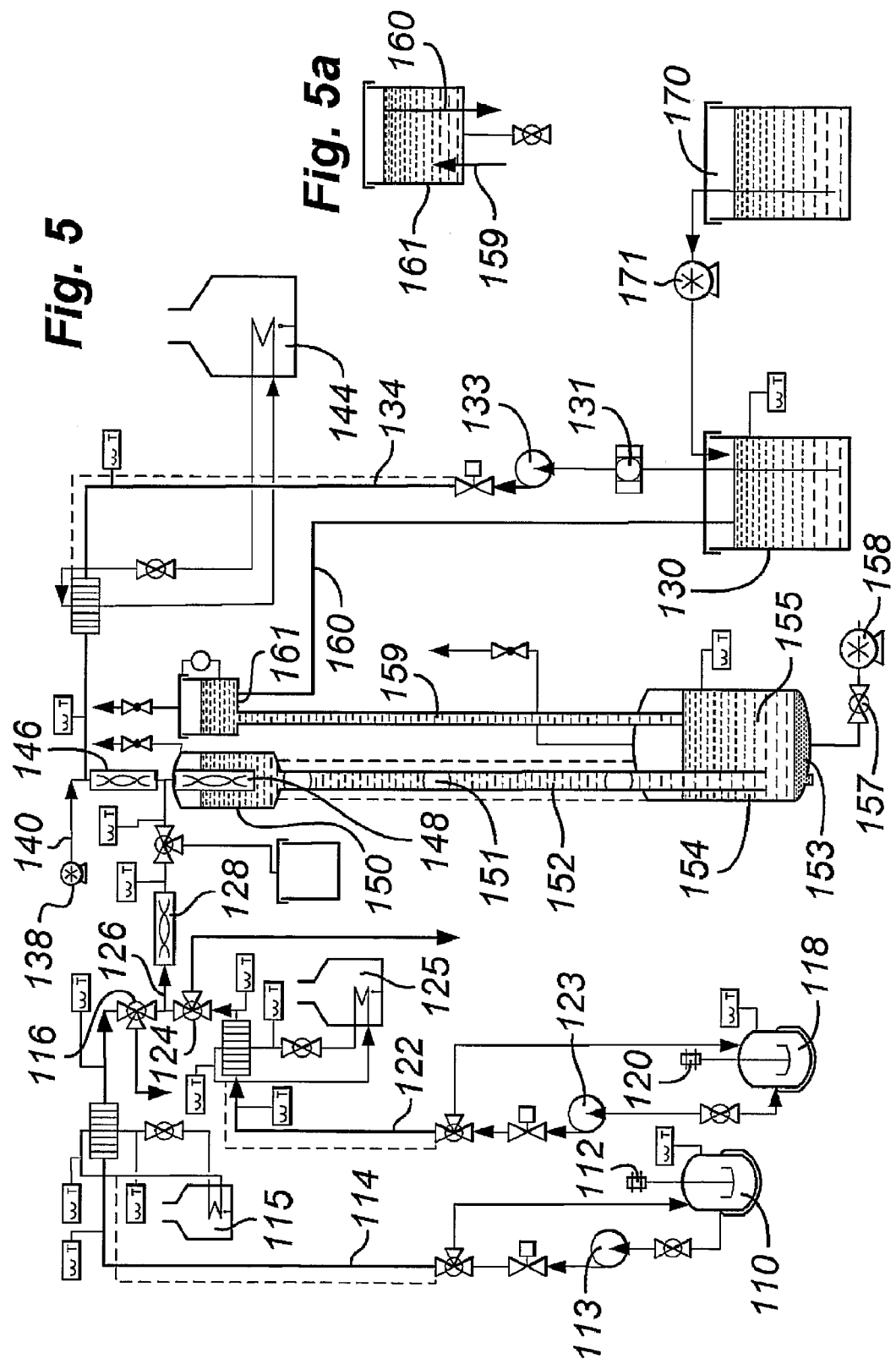

A number of modifications to the embodiment described above have been made and successfully tested, and have already been described with reference to FIG. 5. Instead of pressure forced flow, the novolac stream 114, the hexamine stream 122 and the transformer oil stream 134 are pumped from respective storage vessels 110, 118 and 130 by means of gear pumps 113, 123, 133 which have been found to be sufficiently free of pulsation. Other forms of non-pulsating pumps may be used e.g. rotary vane pumps or peristaltic pumps. The novolak stream and the hexamine stream may incorporate heat exchangers 115, 125 between respective gear pumps 113, 123 and the in-line mixer 128 to heat the streams entering that mixer e.g. to 100-120° C. or above. It is important that the stream of mixed reactants should be sufficiently warm not to unduly decrease the temperature of the transformer oil with which it becomes mixed in the head region 150 of the polymerization column 152, otherwise there is a risk that the required polymerization temperature in the polymerization column 152 (which may incorporate sight glasses 151) may not be maintained over a sufficient portion of the length of that column and polymerization may be incomplete. The Danish oil or other dispersant may be added to the transformer oil at the downstream side of the tube heat exchanger 144 from a supply vessel (not shown) by gear pump 138 and line 140 in order to reduce deposition in the heat exchanger. The receiving vessel 154 may be operated as a settling tank with oil containing a sediment 153 of polymerized beads being drained from the base of the receiving vessel 54 via drain valve 157 and pump 158 (which may take the form of a screw conveyor) and supernatant oil 155 from that vessel is recycled to the oil storage vessel 130. A strainer 131 may be provided in the return line 134 from the oil storage vessel upstream of the gear pump 133 therein for removing solid matter e.g. resin beads from the oil being recycled and facilitating pumping by means of the gear pump. The line 159 from the receiver vessel 154 leads to a header or overflow tank 161 which in this embodiment assists in defining the liquid level in enlarged head region 50, and has an overflow line 160 providing an oil return to the oil storage tank 160. Make-up oil is supplied as required from storage vessel 170 via pump 171.

Preparing Beads for Carbonization and Activation

Beads which have been centrifuged to physically separate transformer oil as far as possible are washed in water to remove ethylene glycol and then vacuum dried to minimise residual water and ethylene glycol.

Carbonization and Activation

A method for carbonization and activation of carbonaceous material is provided. The method is applicable to the carbonization of carbonaceous material comprises material of vegetable origin e.g. coconut-derived material. The conversion of beads of waste ion-exchange resin into carbon adsorbents is disclosed inter alia by Bratek et al., *Carbon*, 40, 2213-2220 (2001). It is also applicable to the carbonization of resin materials e.g. resin beads and especially phenolic resin beads. Where the beads have a mesoporous structure, embodiments of the method permit the mesoporosity to be carried over into the carbonised and activated resin beads produced. The carbonaceous material may be the product of the bead forming method described above.

The kiln may be provided with 5-10 weirs and the weirs may be spaced at equal intervals or at varying intervals along its length. In use, the carbonaceous material forms a bed, portions of which are lifted and cascaded through the kiln atmosphere by longitudinally directed angularly spaced lift bars extending between weirs, the lift bars in an embodiment having a height above the internal cylindrical surface of the kiln which is approximately 50% of the height of the weirs.

The kiln preferably has an entry region configured to dry or remove solvent from the carbonaceous material, the entry region for receiving beads preferably being maintained at not more than 350° C. and preferably not more than 300° C. Superheated steam is preferably introduced at the discharge end of the kiln and flows counter-current to the beads to provide the furnace atmosphere, the steam in an embodiment being introduced at about 150° C. The kiln may be configured to provide a residence time for the carbonaceous material of 2-5 hours.

In an embodiment, carbonization is performed at a temperature of from about 600° C. to about 850° C. in a flow of non oxygen-containing gas. Activation may be performed at a temperature of greater than about 750° C., where the purge gas is steam or greater than about 800° C., where the purge gas is $CO_2$.

The kiln structure is, as previously stated provided in embodiments with 5-10 weirs, and with lift bars between the weirs for agitating the carbonaceous material, lifting portions of the material, and causing lifted material to cascade to the bottom of the kiln through the kiln atmosphere. In embodiments, a housing surrounds the body and partitions spaced along the housing define with the body independently fired heating zones disposed along the kiln e.g. 5-10 independently fired heating zones More specifically beads of cured resin which have been subjected to the above mentioned washing and drying operations may be carbonized and activated in a single operation using the rotary kiln shown in FIGS. 6 and 7.

Figure 6:
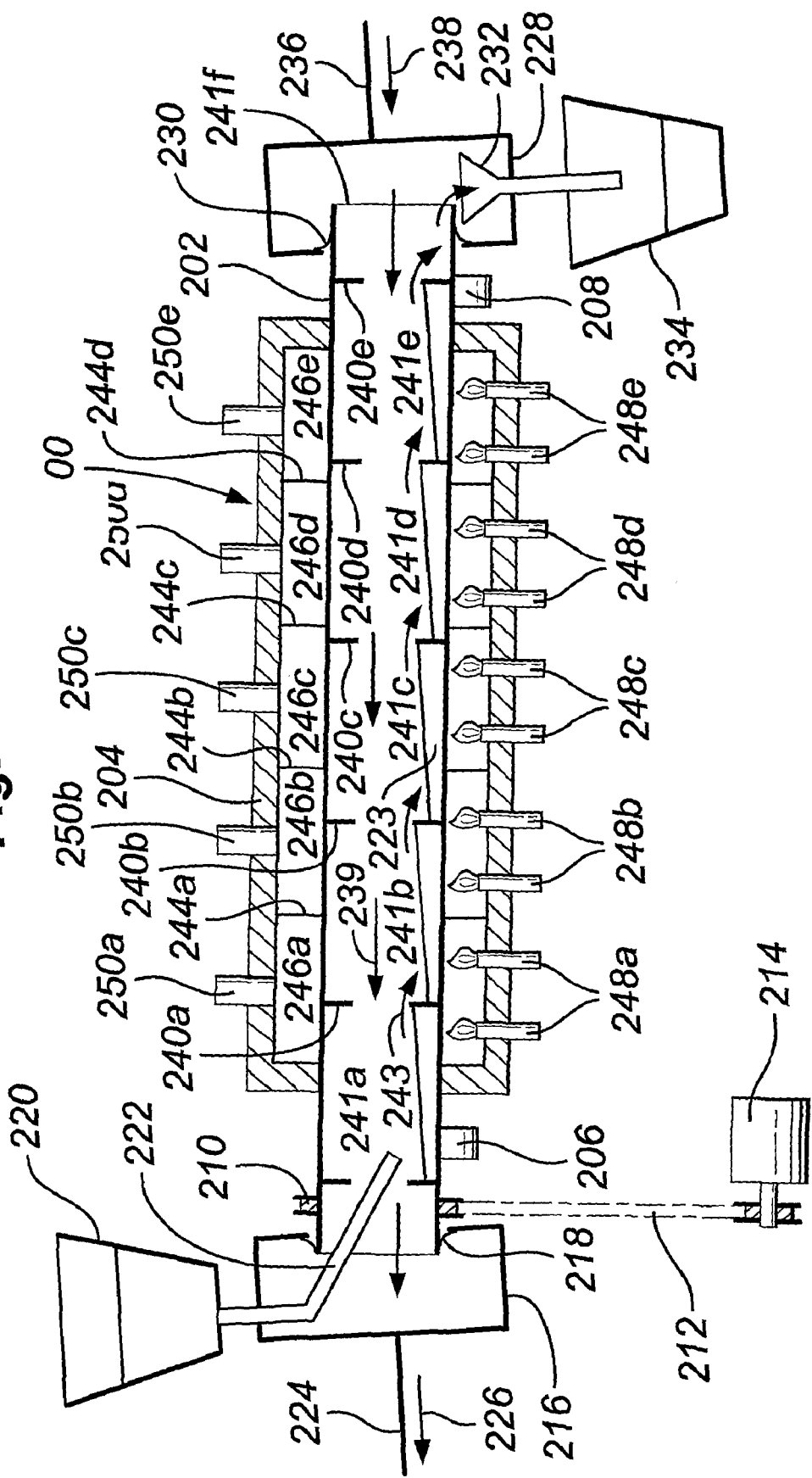
FIG. 6 is a diagrammatic view of a treatment kiln for solvent removal, carbonization and activation according to an embodiment of the invention.

In FIG. 6, a rotary kiln generally indicated by reference numeral 200 comprises an elongate open tubular kiln body 202 e.g. of mild or stainless steel of length about 3.7 metres (12 feet) and diameter about 0.46 metres (18 inches) which is supported for rotation about its longitudinal axis within thermally insulated kiln housing 204 by roller cradle assemblies 206, 208 each comprising three or more support rollers having cylindrical surfaces that provide support for the kiln body and have axes of rotation parallel to the axis of rotation of the kiln body. The length of 3.7 metres was selected for preliminary experiments; in order to facilitate the carrying out of all three operations of final solvent evaporation, carbonization and activation, an increase in kiln length to about 5.5 metres (18 feet) may be desirable. The rollers of the roller cradles may be e.g. of steel or may be of a heat-resistant plastics material e.g. phenolic plastics. Rotation may in an embodiment be by means of a sprocket formation 210 on the outer cylindrical surface of kiln body 202 which is driven by motor and gearbox assembly 214 through drive chain 212. High speeds of rotation are neither necessary nor desirable, and in the present embodiment where the necessary treatment time is a few hours, e.g. about three hours, a speed of rotation of about 1 rpm is suitable. Alternative arrangements are possible e.g. a worm wheel formation on or attached to the outer cylindrical surface of the kiln body and a worm gear driven by a motor and gearbox. The kiln body 202 is supported with its axis directed downwardly towards a discharge end at a small acute angle e.g. about 10° to the horizontal.

An inlet chamber 216 has an opening in one of its faces which receives the inlet end of the kiln body 202, the chamber 216 having a seal 218 which wipes the outer cylindrical surface of the body 202 to provide a gas-tight seal as the body 202 is rotated. A supply hopper 220 or other supply means supplies resin beads to be processed through the chamber 216 via chute 222 to supply end region 241a of the kiln body. Steam carrying gas evolved by the beads during carbonization passes from the kiln body 202 into the chamber 216 and thence into discharge pipe 224 as indicated by arrow 226. Beads being processed pass along the body 202 to discharge end region 241f and thence into discharge chamber 228 which, as in the case of chamber 216 has an opening in one of its faces which receives the discharge end of the kiln body and which has a seal 230 which wipes the outer cylindrical surface of the body to provide a gas-tight seal. Carbonized and activated beads pass into collector funnel 232 and thence into receiving hopper 234. Steam or other activation gas e.g. carbon dioxide passes through line 236 into chamber 228 as indicated by arrow 238, and then passes counter-current to the flow of beads to the chamber 216 as indicated by arrows 239. It is preferred that the atmosphere within the kiln, including the kiln body 202 and inlet and discharge chambers 216, 228 is substantially oxygen-free. Superheated steam e.g. at about 150° C. is suitably injected at line 236 in an amount of 3-4 times stoichiometric based on the amount of carbon to be removed from the carbon char during the activation stage. The required steam flow is in practice of relatively small linear velocity.

The present kiln is shorter than conventional kilns and has a more pronounced downward inclination. The bead material being treated is attrition-resistant and is highly flowable compared e.g. to vegetable char in a conventional activation furnace. For these reasons, the beads tend to flow undesirably rapidly towards the discharge end as the kiln body is rotated, and there would be insufficient time for effective bead treatment. This problem is avoided in the illustrated embodiment by the provision within the kiln body 202 of annular weirs 240a-240e, e.g. of steel plate welded to the inner cylindrical surface of the body, and spaced apart along the length of the body to define bead treatment regions 241a-241e and a bead discharge region 241f downstream of the final annular weir 240e. Each weir retains behind it a body 223 of beads to be treated, and in steady-state operation the volume of beads in the kiln will be about 10% of the total volume of the kiln. In the embodiment of the furnace described above, the maximum bed depth, which is immediately adjacent each weir, is about 10 cm (4 inches). This relatively shallow bed depth contributes to the high speeds of carbonization and activation that can be achieved. Again, in the embodiment described above there were five weirs; in production kilns which as indicated above are longer, this may be increased e.g. to 8-10 weirs, with a corresponding increase in the number of internal partitions and heating zones in the kiln housing. In the illustrated embodiment the zones in the kiln body 241a-241f do not coincide precisely with the heating zones 246a-246f; in other embodiments the axial positions of weirs 240a-240e and the partitions 244a-244d may be readjusted so that these zones do coincide so that individual control of the temperature in each zone of the kiln body is facilitated. Movement of beads from one treatment zone to another is primarily overflow as additional material is supplied, this being represented by the curved arrows 243; speed of rotation is therefore largely or wholly decoupled from bead residence time and can be selected to achieve desirable bed agitation and exposure of the bed contents to the furnace atmosphere and without unacceptable reduction in bead residence time. Furthermore, the provision of internal weirs permits control of material residence time, primarily in terms of the rate of supply of fresh material to the kiln, whereas in a conventional kiln there is no real control of residence time and the reproducibility of the carbonised or activated material produced is poor. For example, if the total volume of the beads in the kiln is about 50 litres and about 10 litres/hour of fresh beads is supplied from hopper 220, then the average bead residence time in the kiln should be about 5 hours.

The thermally insulated kiln housing 204 is of shorter axial length than the kiln body 202 and is sealed thereto at its ends by seals (not shown). It contains annular internal partitions 244a-244d sealed to the outer cylindrical surface of body by seals (not shown) to form heating chambers 246a-246e. The kiln is in this embodiment indirectly gas-fired. Each heating chamber contains a respective pair of gas burners 248a-248e and is vented at outlet 250a-250e, the heat supplied to the kiln at each chamber being independently controllable according to need.

Figure 7:
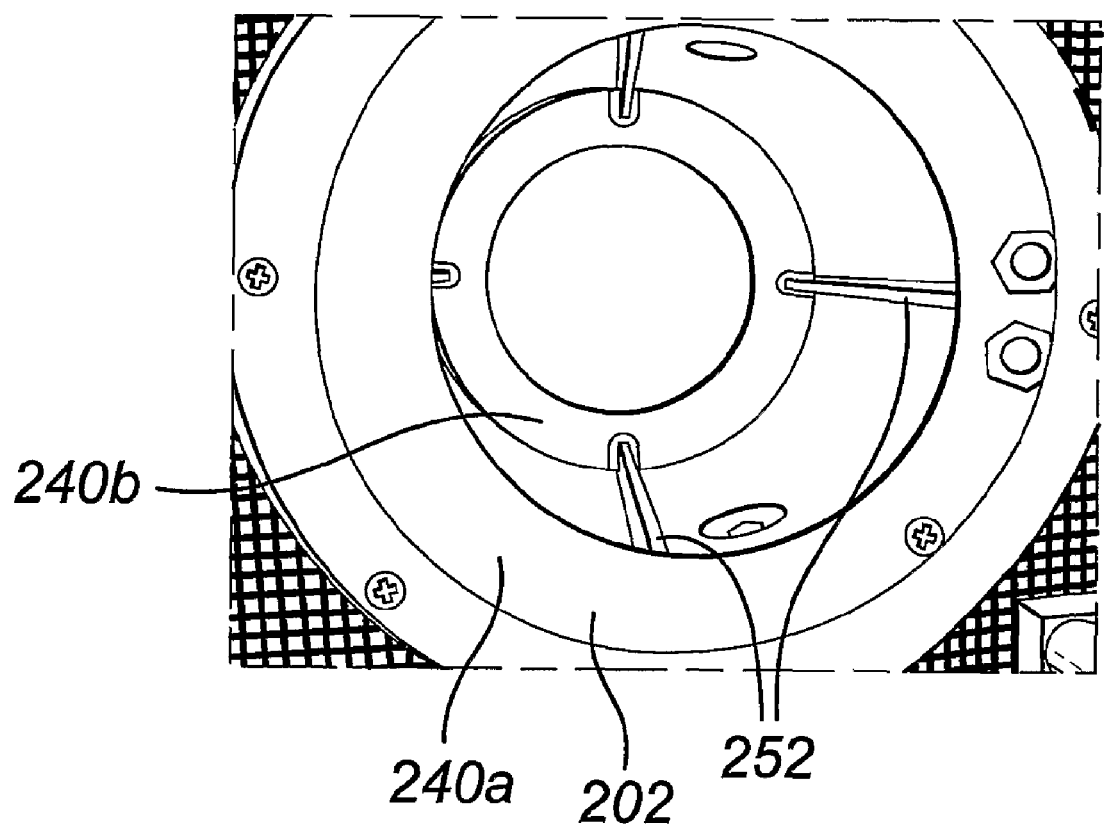
FIG. 7 is a view of the kiln of FIG. 6 looking into the kiln body.

The internal structure of the kiln body is apparent from FIGS. 7 and 8, in which two of the weirs 240a, 240b appear, and between them, as in all the other zones of the kiln there are longitudinally directed angularly spaced agitator or riser bars 252 each extending the full distance between weirs and each of height approximately half that of the weir. As the kiln rotates, the agitator bars 252 stir the bed material and expose fresh bead material to the furnace atmosphere. In addition, some of the beads in each zone are carried by the agitator bars to an upper region of the kiln and as the kiln continues to rotate allowed to fall as a cascade back to the bottom of the kiln. This cascade of beads, which is not a feature of current commercially used carbonizing or activating kilns, promotes contact between the material being carbonised or activated and the furnace atmosphere and hence speeds these operations. The counter-current flow 239 of steam or other activating gas through the kiln is, as previously stated, at relatively low linear velocity and is insufficient to interfere with the cascading beads substantially returning to the treatment zone in which they have originated. Activation in the present kiln can be achieved within a few hours, whereas in a conventional commercial kiln, about 5 days are needed to complete this operation.

In operation, there are three principal regions of the kiln. At the upstream end, there is a region where residual ethylene glycol and other solvent is removed endothermically. This may approximately be equated with region 241a, which should operate at no more than about 300° C. in the case of mesoporous resin beads, preferably about 200-250°, because mesoporosity is progressively lost as temperatures in the feed zone 241a rise above 300° C. Rapid temperature increase follows up to a temperature of about 850° C. as the beads progress to carbonization zone which may be roughly equated with region 241b. The resin of the beads is exothermically converted to char, with evolution of hydrogen-containing gaseous products including monomeric species and oligomeric species of molecular weight e.g. up to about 500. The stream of steam and carbonization gas products carries the evolved gaseous products towards line 224, and optical inspection of the beads at this position in the kiln indicates that they appear white hot. The downstream end of the kiln, roughly defined by zones 241c-241d corresponds roughly to an endothermic activation region where the surface area within the now carbonised beads is increased by removal of carbon in the micropores by the reactions:

$$C+H_2O \rightarrow CO+H_2 \text{ or}$$

$$CO_2+C \rightarrow 2CO.$$

The material at this end of the furnace no longer glows white hot, but maintenance of temperatures in the range 800-850° C. is desirable to enable activation to proceed e.g. about 800°. As the activated carbon leaves the portion of the furnace body 202 within the housing 204, it becomes cooled rapidly to about 150° C. by the incoming steam. It can then be collected as indicated.

The product is an activated carbon in bead form with low fines content both a mesoporous/microporous structure and a high active surface area.

Various modifications and variations of the described aspects of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes of carrying out the invention which are obvious to those skilled in the relevant fields are intended to be within the scope of the following claims.

The invention claimed is:

1. A process for producing discrete solid beads of polymeric material, said process comprising:
    forming a combined stream from a stream of a polymerizable liquid precursor and a stream of a liquid dispersion medium with which the liquid precursor is substantially or completely immiscible;
    treating the combined stream so as to disperse the polymerizable liquid precursor as droplets in the dispersion medium;
    allowing the droplets to polymerise in a laminar flow of the dispersion medium so as to form discrete solid beads that cannot agglomerate; and
    recovering the beads from the dispersion medium,
    the dispersive treatment time being less than 5% of the laminar flow polymerization time so that agglomeration of the liquid precursor during dispersive treatment is substantially avoided.

2. The process of claim 1, wherein the stream of polymerizable liquid precursor comprises polymerizable components in solution in a first polar organic liquid, and the liquid dispersion medium comprises a second non-polar organic liquid, the first and second organic liquids being substantially immiscible.

3. The process of claim 2, wherein the first organic liquid is ethylene glycol or diethylene glycol and the second organic liquid is mineral oil or transformer oil.

4. The process of claim 1, further comprising: forming the polymerizable liquid precursor by combining and mixing first and second component streams thereof in an in line mixer.

5. The process of claim 4, wherein the first component stream comprises a phenolic nucleophilic component dissolved in a pore former and the second component stream comprises a cross-linking agent dissolved in the pore former, wherein the pore former is ethylene glycol, the phenolic nucleophilic component is a novolac with a molecular weight of less than 1500, and the cross-linking agent comprises hexamethylenetetramine, melamine or hydroxymethylated melamine.

6. The process of claim 4, which comprises supplying the first and second streams from respective first and second vessels by pressurising said vessels.

7. The process of claim 4, which comprises supplying the first and second streams from respective first and second vessels using non-pulsating pumps, wherein the non-pulsating pumps are gear or rotary vane pumps.

8. The process of claim 4 wherein mixing the combined first and second component streams in the in-line mixer is at a temperature greater than or equal to 20° C. below the laminar flow polymerization temperature where polymerization to give a solid particle is complete in less than 2-4 minutes, wherein the temperature of the stream of liquid dispersion medium is less than or equal to 10° C. below the laminar flow polymerization temperature prior to combination with the stream of polymerizable liquid precursor.

9. The process of claim 1 wherein the dispersion treatment is carried out in an in-line mixer.

10. The process of claim 9, wherein the dispersion treatment is carried out under turbulent conditions or transition turbulent conditions, wherein the volume flow rate of the stream of liquid dispersion medium is 3-10 times that of the polymerizable liquid precursor, wherein the combined stream treatment is completed so as to disperse the polymerizable liquid precursor as droplets in the suspension medium within 0.2-5 secs, wherein the combined stream is treated to form droplets which give rise to polymer beads of volume average size in the range 100-1000 μm, wherein the combined stream is treated to form droplets that give rise to polymerized beads having a $D_{90}/D_{10}$ particle size distribution less than or equal to 10.

11. The process of claim 1, further comprising: supplying the stream of liquid dispersion medium having the polymerizable liquid precursor dispersed as droplets to a vertical polymerization column having a descending flow of liquid suspension medium, the density of the droplets being greater than the density of the liquid suspension medium.

12. The process of claim 11, wherein the dispersion medium descends the column in 0.5-1.5 hours and dispersed droplets of mean size ~400 μM descend the column in an average time of about 1-5 minutes.

13. The process of claim 1, further comprising:
    collecting polymerized beads from the polymerization column in a collection vessel by sedimentation or by centrifugation;

recycling dispersion medium from which polymerized beads have been recovered;

washing the centrifuged beads with water to remove pore-former; and vacuum drying the beads to recover pore-forming solvent and recycling the recovered pore-forming solvent for production of hexamine/solvent solution and/or resin/solvent solution.

14. The process of claim 1, further comprising carbonizing and activating the beads by supplying the beads to an externally fired rotary kiln maintained at carbonizing and activating temperatures, the kiln having a downward slope to progress the material as it rotates, the kiln having an atmosphere substantially free of oxygen provided by a countercurrent of steam or carbon dioxide, and annular weirs being provided at intervals along the kiln to control progress of the beads.

15. The process of claim 14, wherein the kiln is provided with 5-10 weirs along its length, wherein the beads form a bed, portions of which are lifted and cascaded through the kiln atmosphere by longitudinally directed angularly spaced lift bars extending between weirs, wherein the lift bars have a height above an internal cylindrical surface of the kiln which is approximately 50% of the height of the weirs, wherein the kiln has an entry region configured to dry or remove solvent from the beads and maintained at a temperature not more than 300° C., wherein superheated steam at about 150° C. is introduced at the discharge end of the kiln and flows countercurrent to the beads to provide the kiln atmosphere and the kiln is configured to provide a residence time for the beads of 2-5 hours.

16. A process for producing discrete solid beads of polymeric material, said process comprising:

forming a combined stream from a stream of a polymerizable liquid precursor and a stream of a liquid dispersion medium with which the liquid precursor is substantially or completely immiscible;

treating the combined stream so as to disperse the polymerizable liquid precursor as droplets in the dispersion medium;

allowing the droplets to polymerise in a laminar flow of the dispersion medium so as to form discrete solid beads that cannot agglomerate; and recovering the beads from the dispersion medium, the dispersive treatment time being 0.2-5 sec and the polymerization time being 30 secs to 5 mins, whereby agglomeration of the liquid precursor during dispersive treatment is substantially avoided.

17. The process of claim 16, wherein dispersive treatment time is 1-3 sec.

18. The process of claim 16, wherein polymerization time is 1-4 mins.

19. The process of claim 16, wherein the stream of polymerizable liquid precursor comprises polymerizable components in solution in a first polar organic liquid, and the liquid dispersion medium comprises a second non-polar organic liquid, the first and second organic liquids being substantially immiscible.

20. The process of claim 19, wherein the first organic liquid is ethylene glycol or diethylene glycol and the second organic liquid is mineral oil or transformer oil.

21. The process of claim 16, further comprising:

forming the polymerizable liquid precursor by combining and mixing first and second component streams, the first component stream comprising a phenolic nucleophilic component dissolved in a pore former and the second component stream comprising a cross-linking agent dissolved in the pore former, wherein the pore former is ethylene glycol, the phenolic nucleophilic component is a novolac with a molecular weight of less than 1500, and the cross-linking agent comprises hexamethylenetetramine, melamine or hydroxymethylated melamine.

\* \* \* \* \*

UNITED STATES PATENT AND TRADEMARK OFFICE
CERTIFICATE OF CORRECTION

PATENT NO. : 8,383,703 B2  
APPLICATION NO. : 12/444839  
DATED : February 26, 2013  
INVENTOR(S) : Tennison et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 846 days.

Signed and Sealed this
Seventeenth Day of September, 2013

Teresa Stanek Rea
*Deputy Director of the United States Patent and Trademark Office*